United States Patent
Ng et al.

(10) Patent No.: US 9,116,615 B2
(45) Date of Patent: Aug. 25, 2015

(54) USER INTERFACE FOR A TOUCHSCREEN DISPLAY

(75) Inventors: Oliver Ng, Markham (CA); Michael George Langlois, Almonte (CA); Joel Paul Steele, Richmond Hill (CA); David Bukurak, Ottawa (CA); Donald James Lindsay, Mountain View, CA (US)

(73) Assignee: BlackBerry Limited, Waterloo, Ontario (CA)

( * ) Notice: Subject to any disclaimer, the term of this patent is extended or adjusted under 35 U.S.C. 154(b) by 436 days.

(21) Appl. No.: 12/903,423

(22) Filed: Oct. 13, 2010

(65) Prior Publication Data

US 2011/0087990 A1   Apr. 14, 2011

Related U.S. Application Data

(60) Provisional application No. 61/251,179, filed on Oct. 13, 2009, provisional application No. 61/251,188, filed on Oct. 13, 2009.

(51) Int. Cl.
*G06F 3/048* (2013.01)
*G06F 3/0488* (2013.01)
*G06F 3/0481* (2013.01)

(52) U.S. Cl.
CPC .......... *G06F 3/04886* (2013.01); *G06F 3/0481* (2013.01)

(58) Field of Classification Search
CPC ............. G06F 3/0481; G06F 3/04886; G06F 3/04817; G06F 3/0482; G06F 3/0485
USPC .......................... 715/773, 778, 752, 788, 797
See application file for complete search history.

(56) References Cited

U.S. PATENT DOCUMENTS 5,859,639 A * 1/1999 Ebrahim ....................... 715/788
7,712,048 B2 * 5/2010 Rockey et al. ................ 715/811
(Continued)

FOREIGN PATENT DOCUMENTS

| CA | 2508901 | 12/2005 |
| EP | 1898283 A2 | 3/2008 |
| EP | 1898293 | 3/2008 |

OTHER PUBLICATIONS

Extended European Search Report dated Aug. 18, 2011 from EP10187481.6.
(Continued)

*Primary Examiner* — Steven Sax
*Assistant Examiner* — Christopher J Fibbi
(74) *Attorney, Agent, or Firm* — Fish & Richardson P.C.

(57) ABSTRACT

A device, which may have a touchscreen display, and methods for its operation are provided using a graphical user interface and an overlay user input interface such as a virtual keyboard. The graphical user interface may include one or more user interface elements displayed in a first region of the display that are actuatable to invoke a corresponding function. When the virtual keyboard is invoked for display in the same region, the underlying graphical user interface is redrawn with a further user interface element corresponding to at least one of the user interface elements previously displayed in the first region, so that the further user interface element is actuatable to invoke a command to carry out the corresponding function. In another embodiment, the virtual keyboard may be modified instead to provide an action key corresponding to a function related to an application executing on the device.

14 Claims, 18 Drawing Sheets

(56) References Cited

U.S. PATENT DOCUMENTS

| | | | |
|---|---|---|---|
| 2002/0085038 A1* | 7/2002 | Cobbley et al. | 345/773 |
| 2005/0012723 A1* | 1/2005 | Pallakoff | 345/173 |
| 2006/0033724 A1* | 2/2006 | Chaudhri et al. | 345/173 |
| 2007/0282957 A1* | 12/2007 | Van Belle et al. | 709/206 |
| 2008/0094369 A1* | 4/2008 | Ganatra et al. | 345/173 |
| 2008/0163090 A1* | 7/2008 | Cortright | 715/771 |
| 2010/0169818 A1* | 7/2010 | Hughes et al. | 715/773 |
| 2011/0010656 A1* | 1/2011 | Mokotov | 715/780 |
| 2011/0072492 A1* | 3/2011 | Mohler et al. | 726/3 |

OTHER PUBLICATIONS hrmpf.com, "Apple's Tablet Virtual Keyboard UI", Feb. 16, 2006, http://hrmpf.com/wordpress/57/apples-tablet-virtual-keyboard-ui.

Sheets, B., "iphone-keyboard", 2009 Mactoids, http://mactoids.com/hidden-feature-in-your-iphone-keyboard/.

Davies, C., "Android getting virtual keyboard", Nov. 2007, http://androidcommunity.com/forums/f27/android-getting-virtual-keyboard-4446/.

GIT Mobile, "Palm Pre Receives a Virtual Keyboard", Aug. 19, 2009, http://www.gitmobile.com/2009/08/palm-pre-receives-a-virtual-keyboard/.

Author unknown, "iPhone keyboard mock-up", 2006, http://www.iphone-ipod.org/iphone-keyboard-mock-up/.

Gearfuse, "New iPhone Video clears up some details on the keyboard", Jun. 27, 2007, http://www.gearfuse.com/new-iphone-video-clears-up-some-details-on-the-keyboard/.

Siry, Marc, "Per iPhone: Google is a Verb", (http://marcsiry.blogspot.com/2008/08/per-iphone-google-is-verb.html), 4 pgs., Aug. 7, 2008.

Taylor, Dave, "Can I set 'current location' as an end point in Apple iPhone Google Maps?", (http://www.askdavetaylor.com/set_current_location_end_point_in_apple_iphone_google_maps.html), 4 pgs., circa Mar. 2009, published by Intuitive Systems, LLC.

Taylor, Alun, "Acer DX900 dual-SIM Windows smartphone", (http://www.reghardware.co.uk/2009/04/29/review_smartphone_acer_dx900/print.html), 8 pgs., posted Apr. 29, 2009, published by Situation Publishing Ltd.

XDA-Developers.com forum, "HTC full screen virtual keyboard download", (http://forum.xda-developers.com/showthread.php?t=333772&page=2), 8 pgs., posted Aug. 2007.

Office Action mailed Dec. 12, 2012, in corresponding Canadian patent application No. 2,717,553.

* cited by examiner

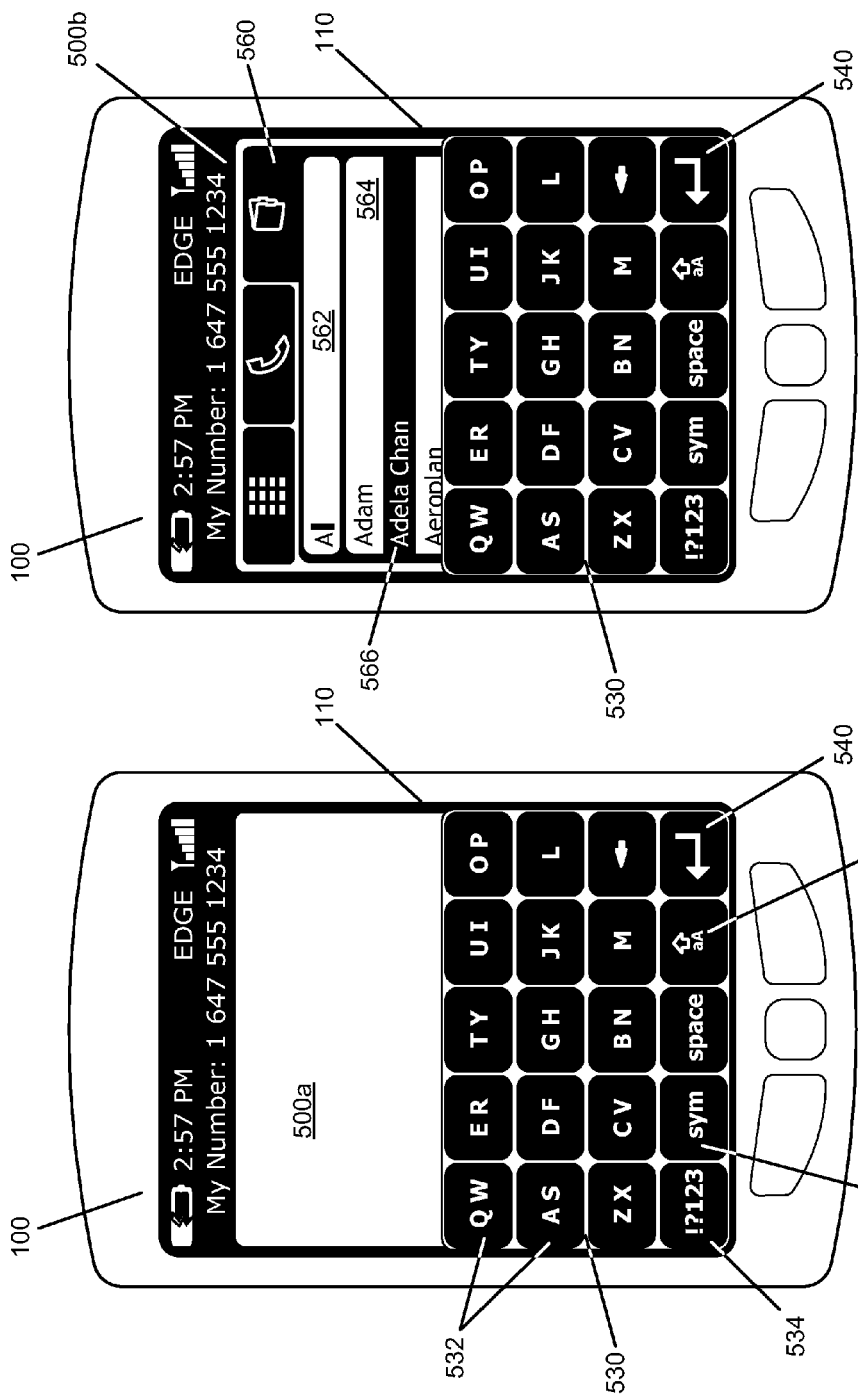

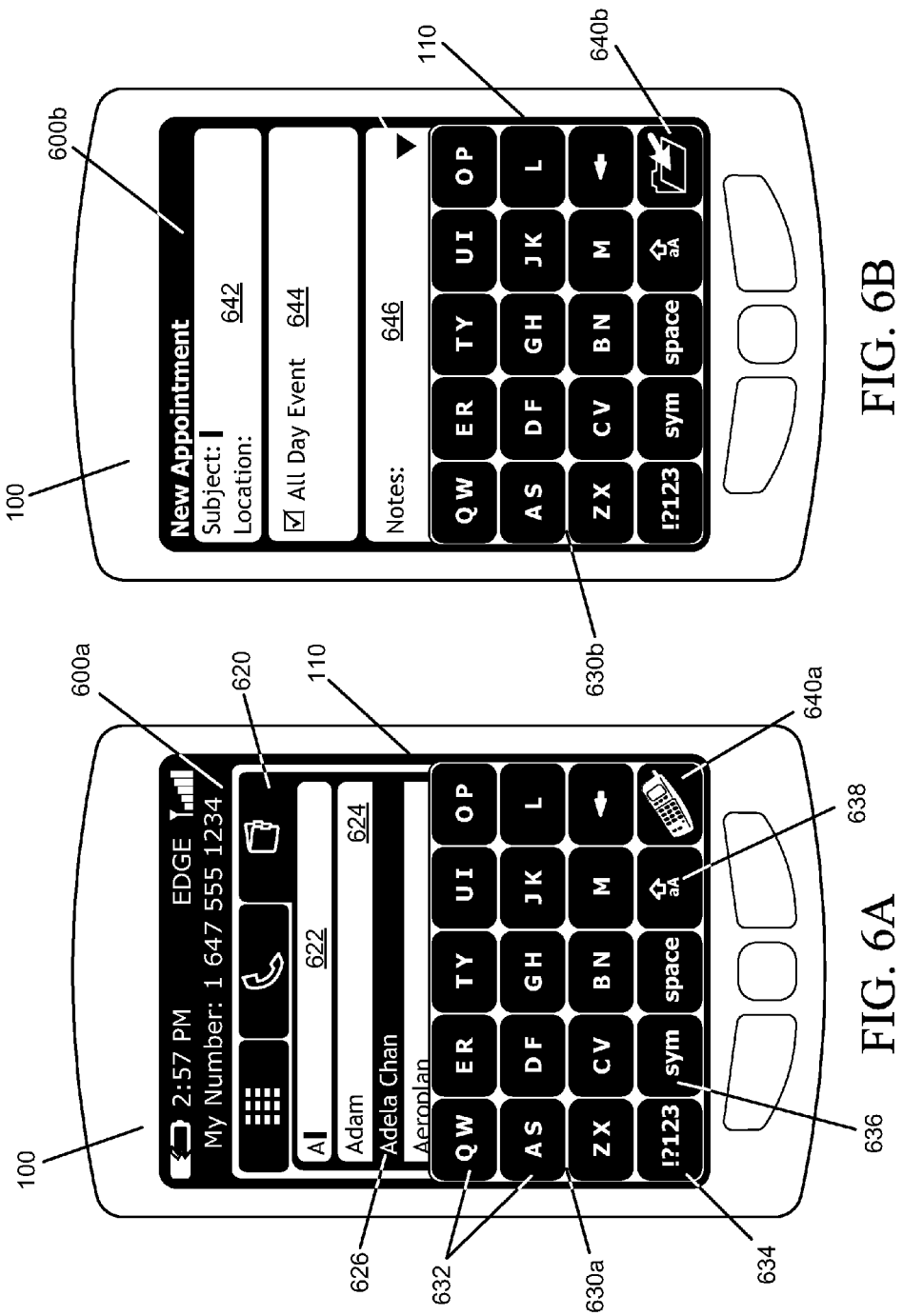

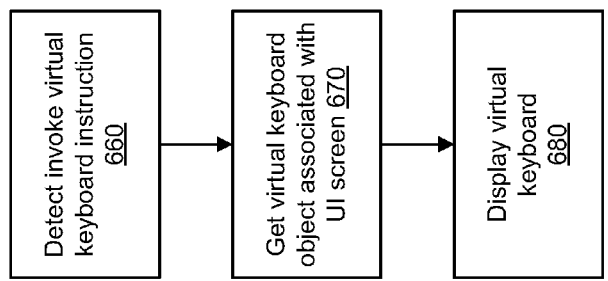
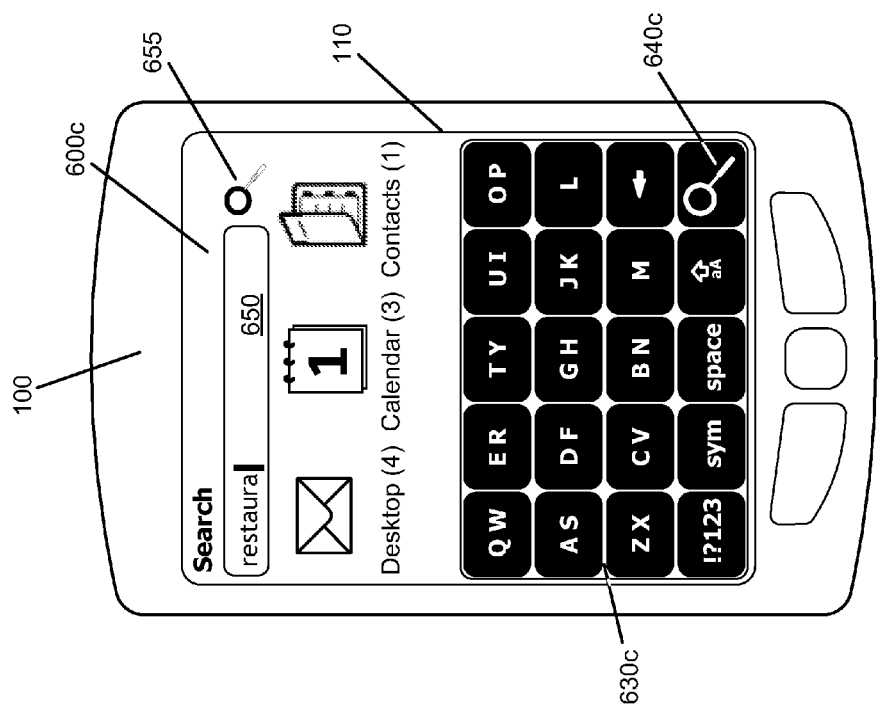
FIG. 6C
FIG. 6D

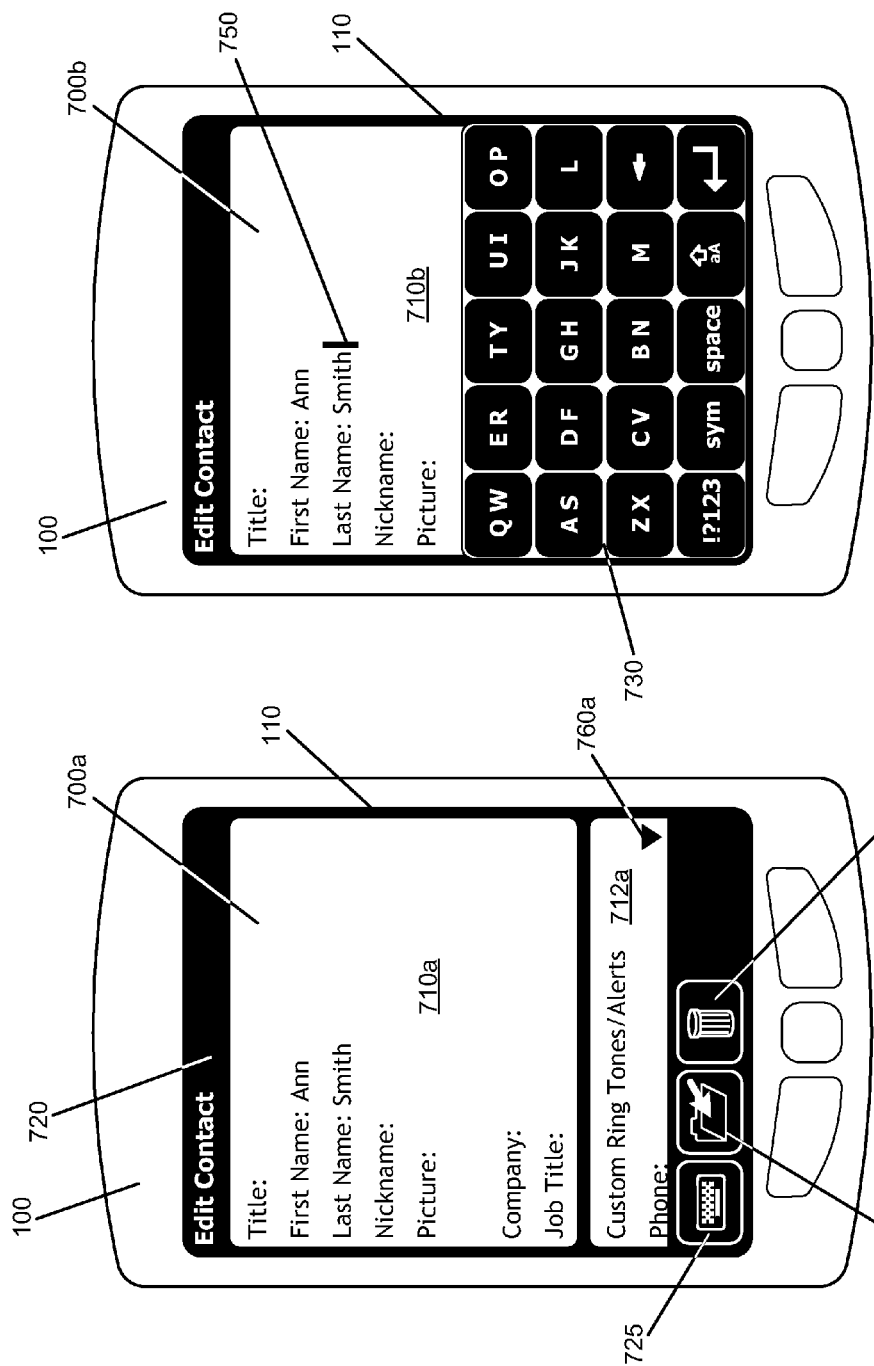

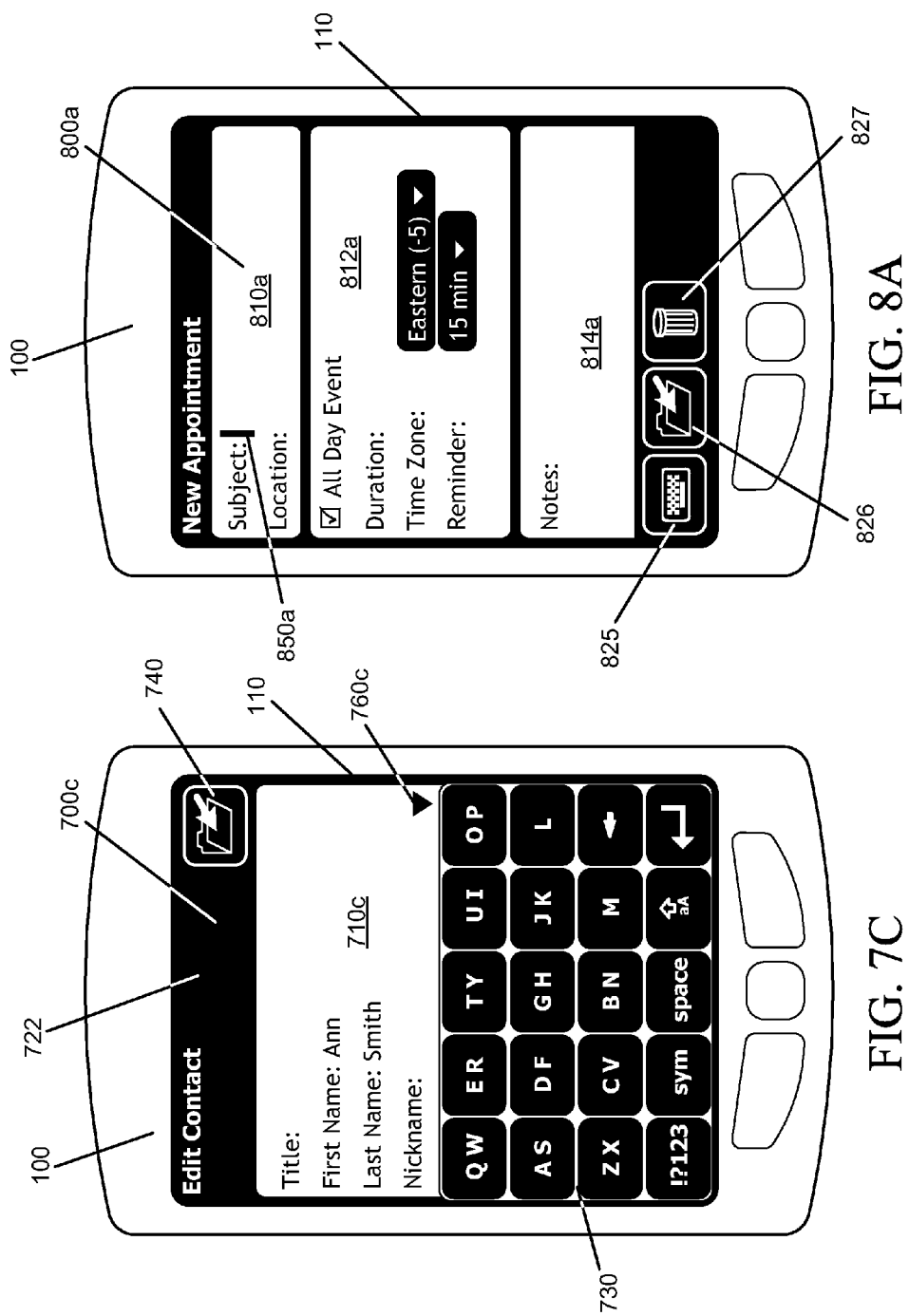

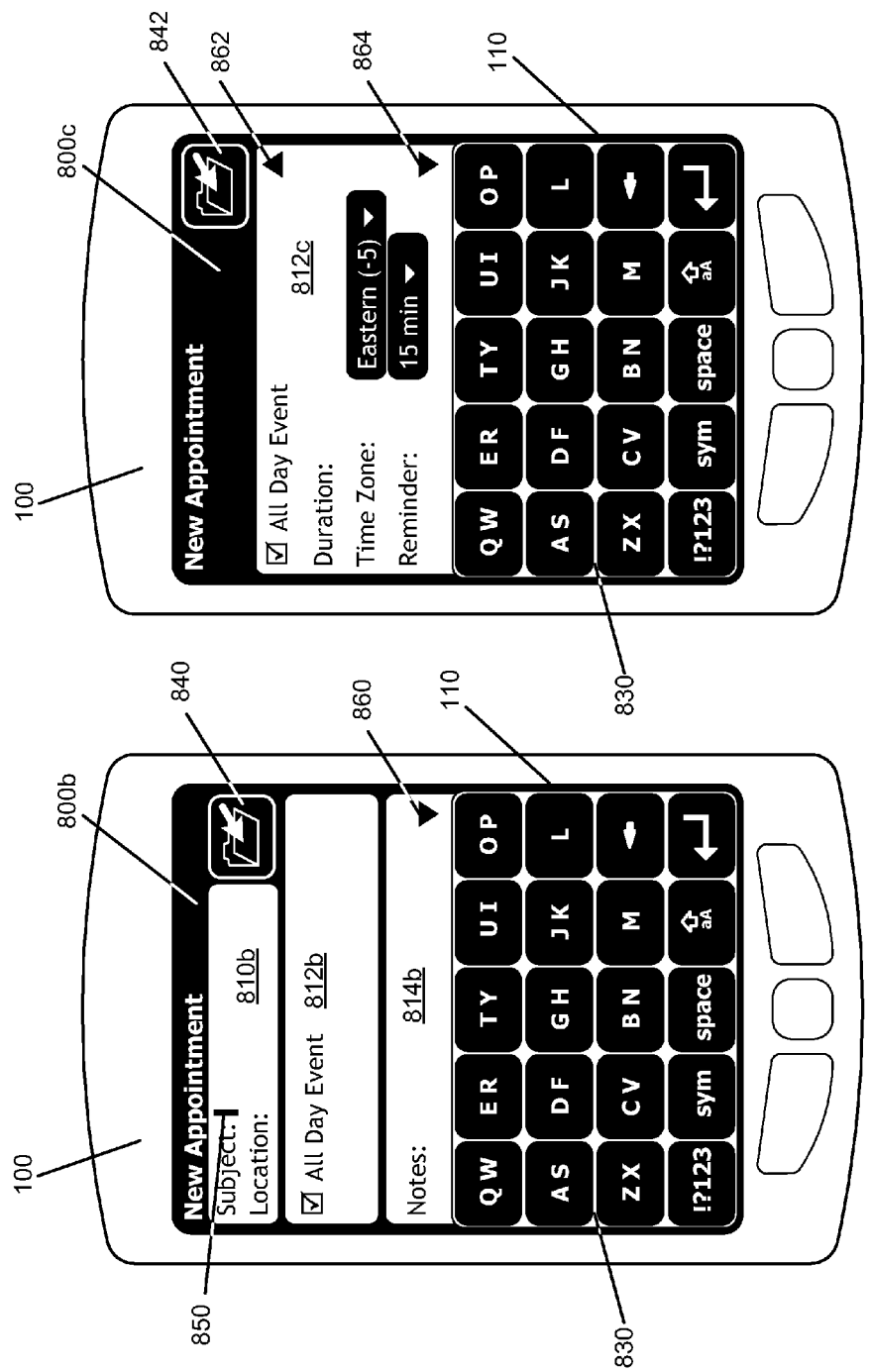

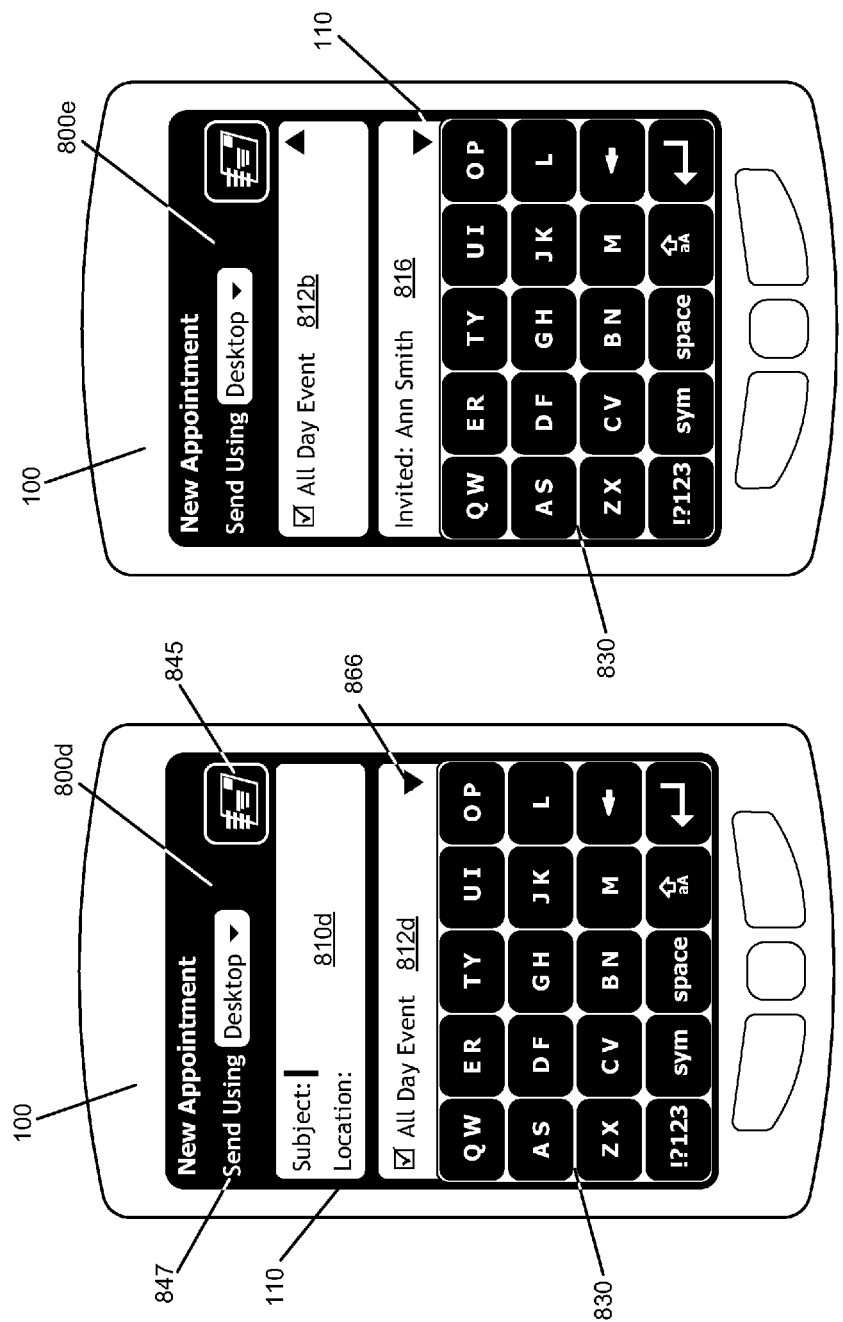

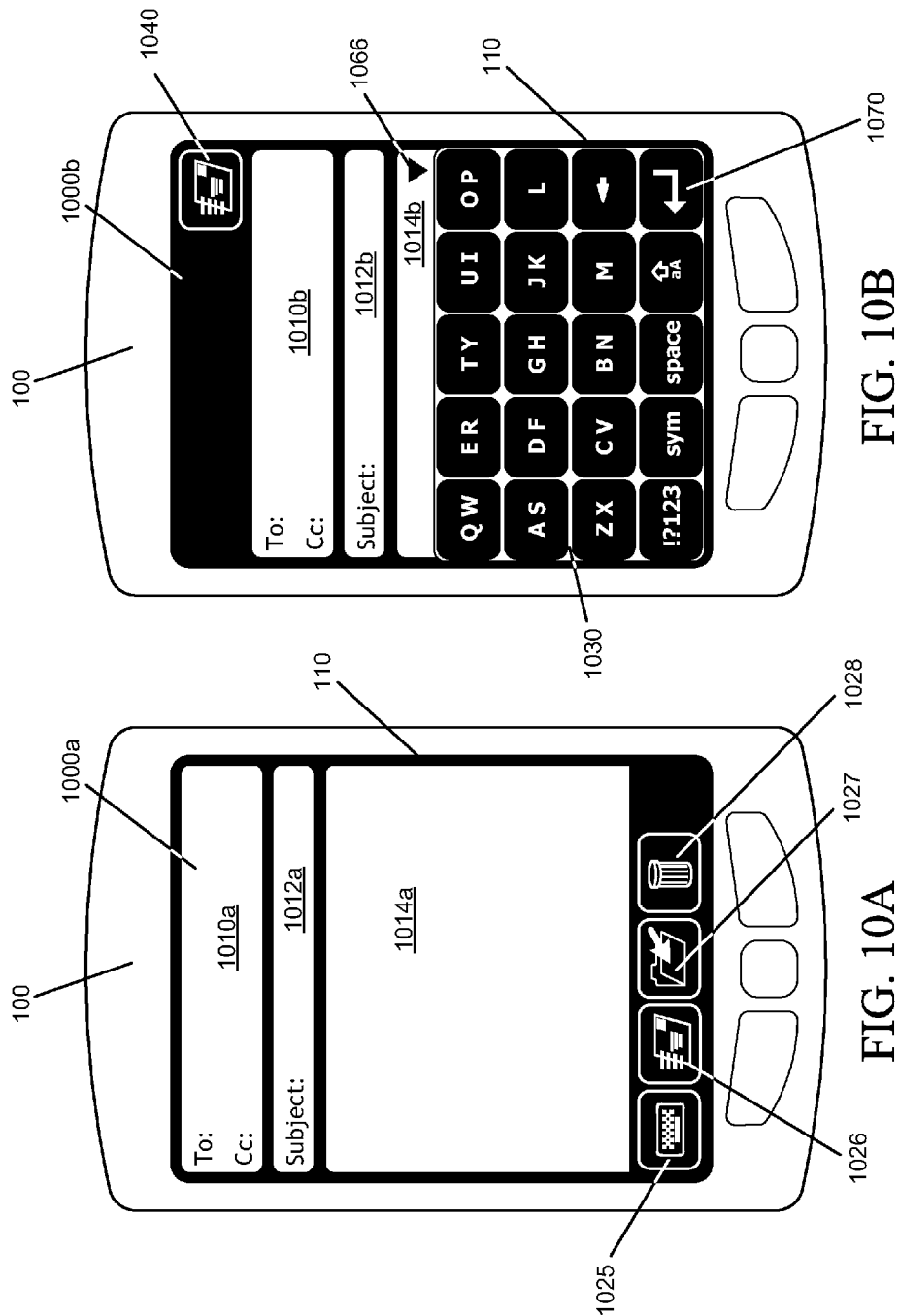

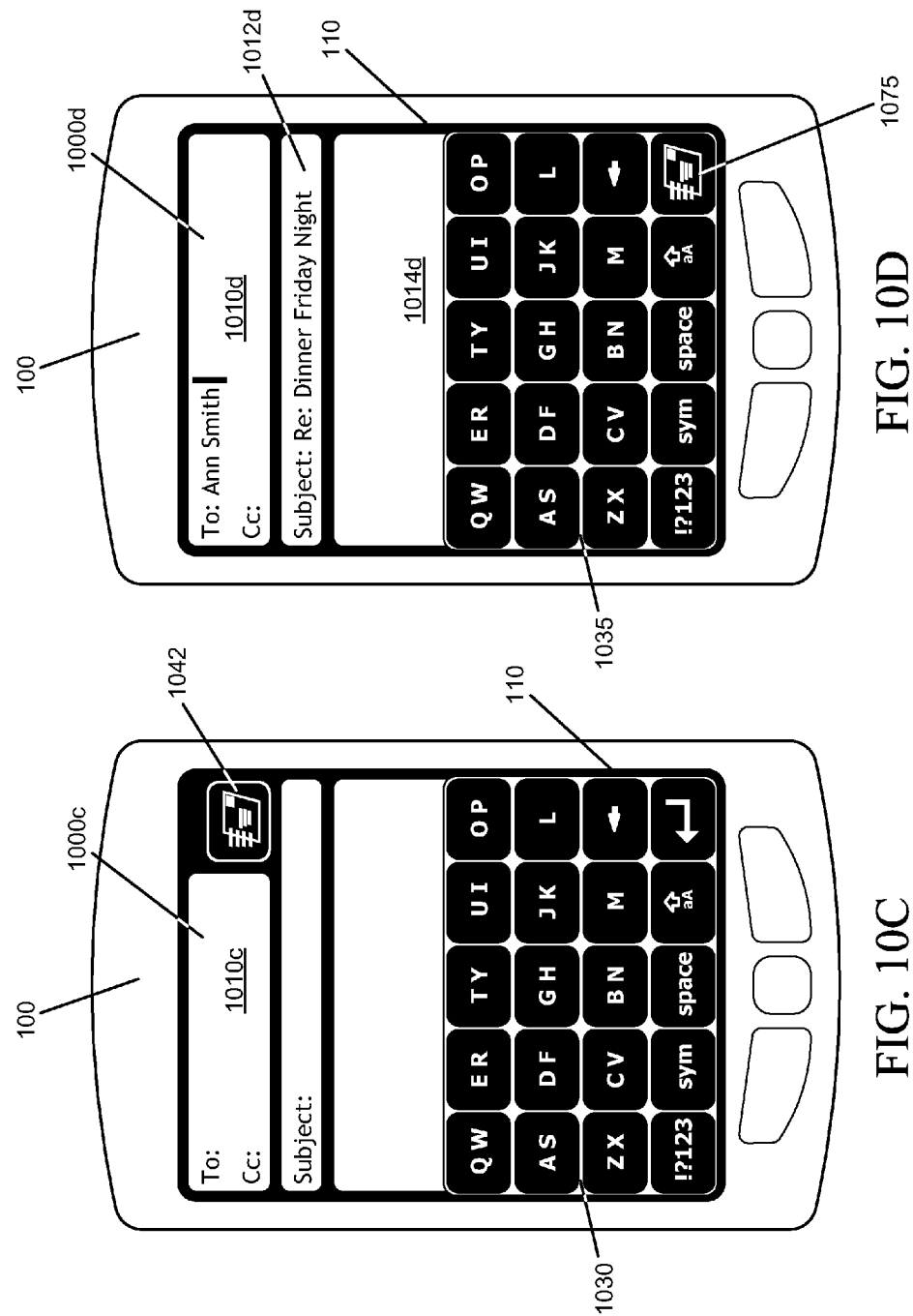

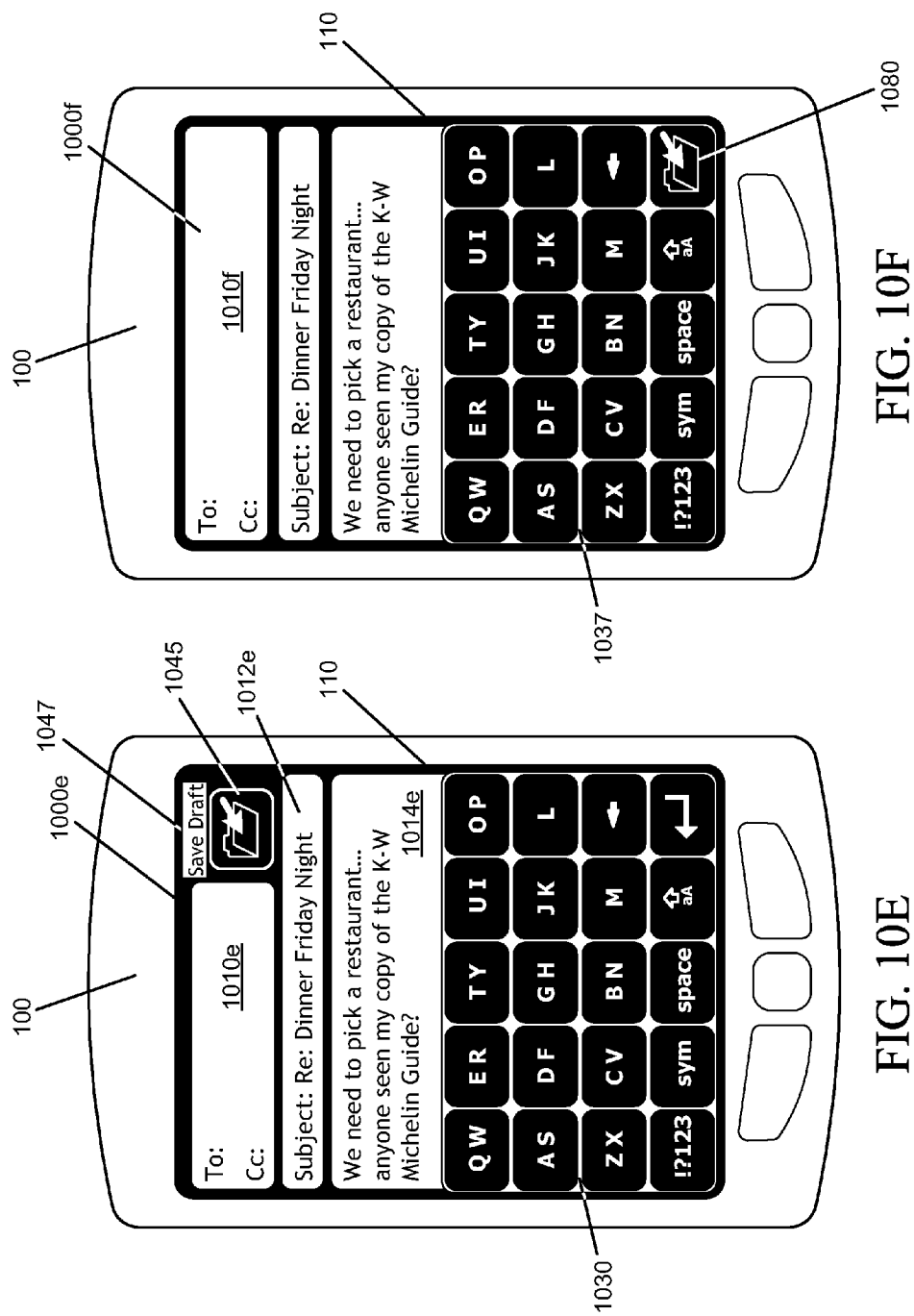

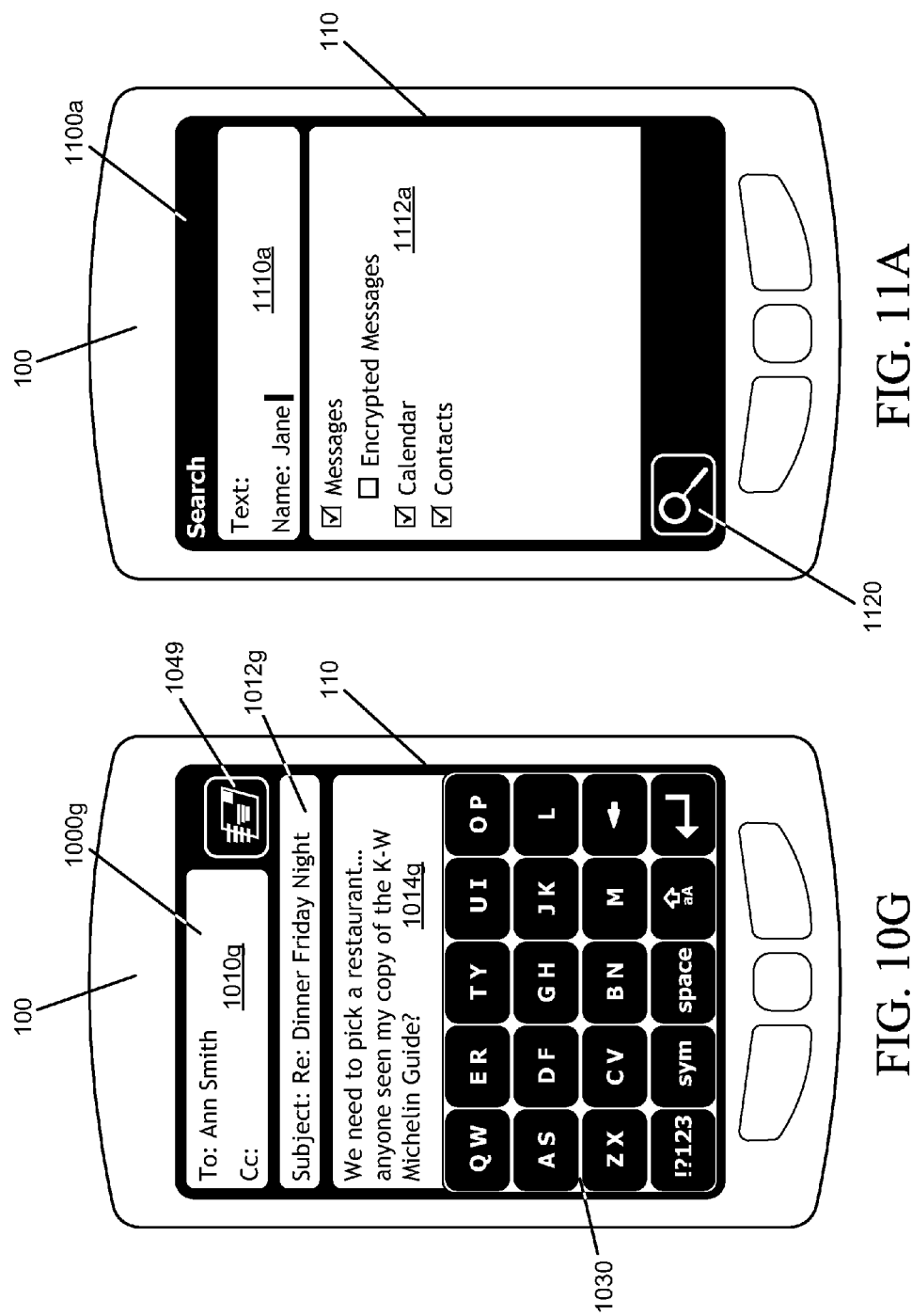

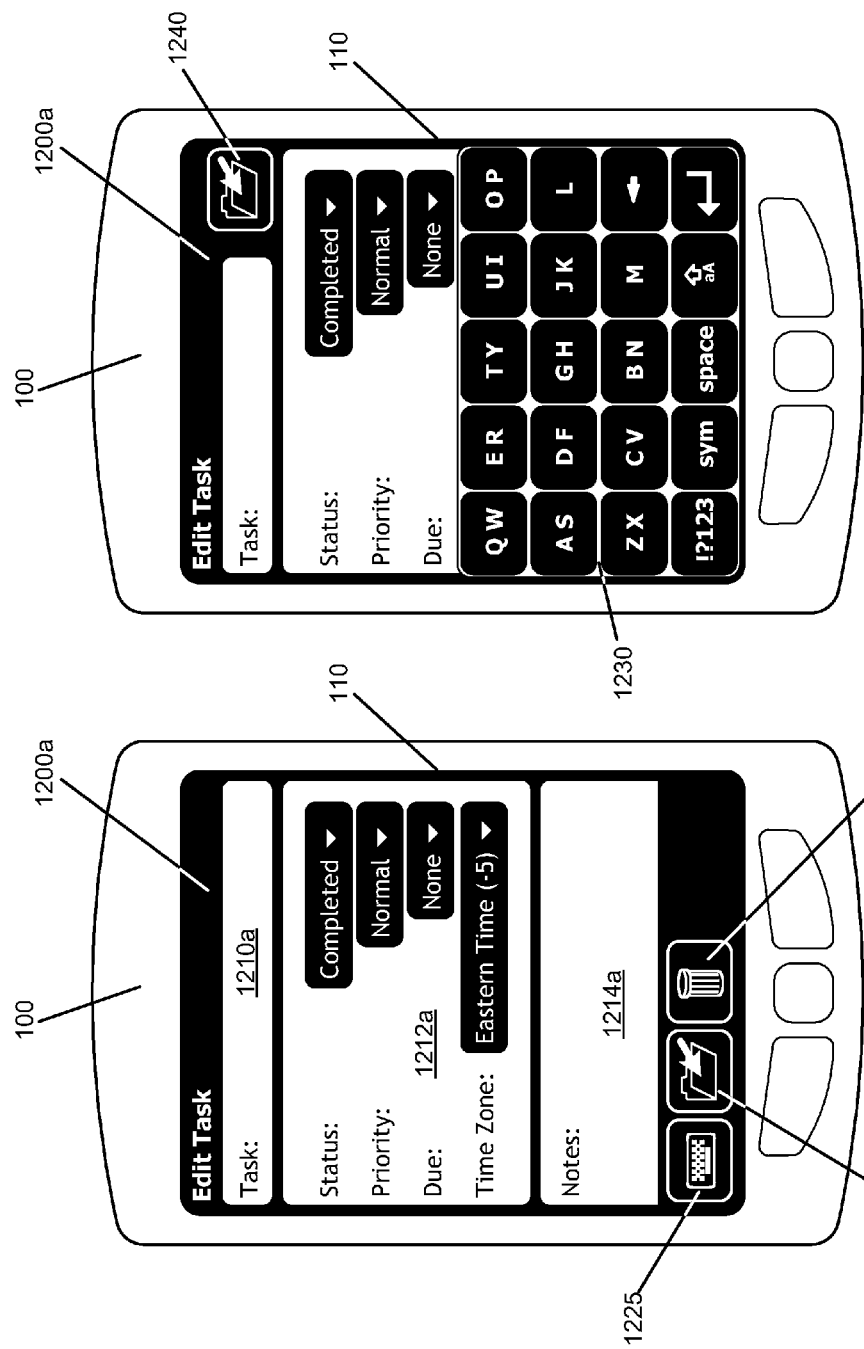

USER INTERFACE FOR A TOUCHSCREEN DISPLAY

CROSS-REFERENCE TO RELATED APPLICATIONS

This application claims priority to U.S. Provisional Application No. 61/251,179 filed on 13 Oct. 2009 and to U.S. Provisional Application No. 61/251,188 filed on 13 Oct. 2009, the entireties of which are incorporated herein by reference.

BACKGROUND

1. Technical Field

The present invention relates to user interfaces on a communication device having a touchscreen display.

2. Description of the Related Art

Communication and data processing devices, such as smart phones, personal digital assistants (PDAs), personal computers, tablet computers, and the like, may be provided with a touchscreen display, which functions as both a display interface for displaying information to a user, and a user input interface for receiving input from the user. Touchscreen displays may include, without limitation, resistive touchscreens, capacitive touchscreens, projected capacitive touchscreens, infrared touchscreens and surface acoustic wave (SAW) touchscreens. Input may be detected in response to user manipulation of the touchscreen, through the use of presses, gestures, taps, and the like, which may be detected as actions operating on graphical elements displayed on the touchscreen interface. These graphical elements can include virtual buttons, keys, sliders and other such controls. If there are space or size constraints in the communication device design, a touchscreen device may not include a physical keyboard for text or numeric data entry. Therefore, the device may also be configured to provide a virtual keyboard including graphic elements that may be manipulated by the user to input alphanumeric data.

BRIEF DESCRIPTION OF THE DRAWINGS

In drawings which illustrate by way of example only embodiments of the present invention.

FIG. 5A is a diagram of a first graphical user interface and a virtual keyboard for display on a communication device such as the communication device of FIG. 1.

FIG. 5B is a diagram illustrating a further graphical user interface and a virtual keyboard in a contacts view displayed on a communication device.

FIG. 6A is a further illustration of a graphical user interface in a contacts view and a modified virtual keyboard.

FIGS. 6B and 6C are further illustrations of graphical user interfaces and modified virtual keyboards in alternate views displayed on a communication device.

FIG. 6D is a flowchart of a process for displaying a virtual keyboard on the communication device of claim 1.

FIG. 7A is a diagram illustrating a graphical user interface for display on a communication device for editing contact information.

FIG. 7B is a further illustration of a graphical user interface for editing contact information and a virtual keyboard for display on a communication device.

FIG. 7C is an illustration of a modified graphical user interface for editing contact information and the virtual keyboard of FIG. 7B.

FIG. 8A is a diagram illustrating a graphical user interface for display on a communication device for editing appointment data.

FIGS. 8B to 8E are illustrations of a virtual keyboard with modified graphical user interfaces for editing appointment data on a communication device.

FIG. 10A is a diagram illustrating a graphical user interfaces for display on a communication device for composing and sending a message.

FIGS. 10B and 10C are illustrations of a virtual keyboard and modified graphical user interfaces for composing and sending a message.

FIG. 10D is a further illustration of a graphical user interface for composing and sending a message, shown with a modified virtual keyboard.

FIG. 10E is a further illustration of a virtual keyboard and modified graphical user interface for composing and sending a message.

FIG. 10F is a still further illustration of a graphical user interface for composing and sending a message, shown with a modified virtual keyboard.

FIG. 10G is a still further illustration of a virtual keyboard and modified graphical user interface for composing and sending a message.

FIG. 11A is a diagram illustrating a user interface for a mobile device for searching data stored on a communication device.

FIG. 12A is a diagram illustrating a graphical user interface for display on a communication device for editing a task item.

FIG. 12B is an illustration of a virtual keyboard displayed with a modified graphical user interface for editing a task item.

DETAILED DESCRIPTION

Figure 1:
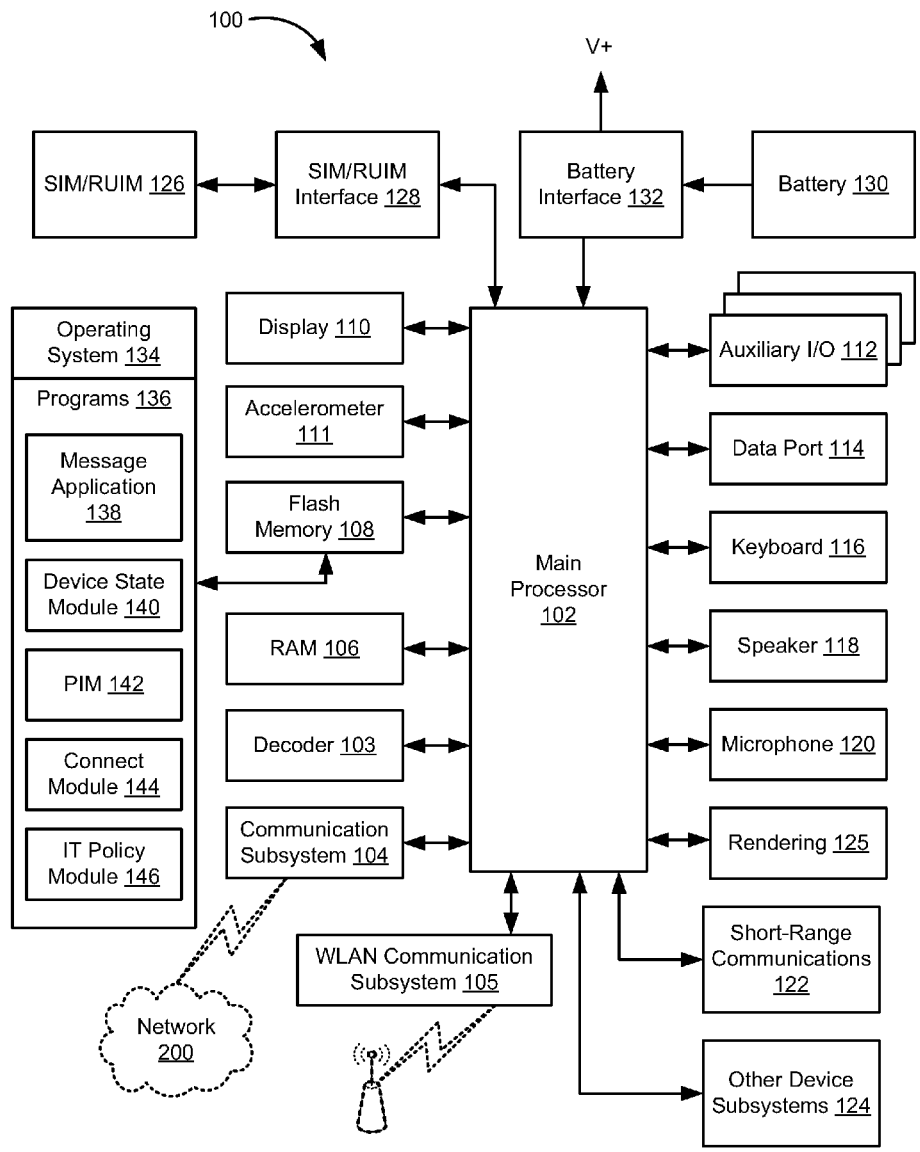
FIG. 1 is a block diagram of an embodiment of a mobile device.

The embodiments described herein a provided a user interface for a touchscreen display with improved accessibility to graphical user interface features when select views or contexts are invoked in an application executing on a communication device, as well as improved accessibility when a virtual keyboard or other similar overlay is enabled on the touchscreen display.

In accordance with the embodiments described herein there is provided a device comprising a touchscreen display adapted to present a graphical user interface, the graphical user interface comprising one or more user interface elements, each said user interface element being actuatable using the touchscreen display to invoke a corresponding function, wherein the device is adapted to display an overlay user input interface such that said one or more user interface elements are not actuatable; and while said overlay user input interface is displayed, display a modified graphical user interface wherein at least one of said one or more user interface elements is presented, such that said at least one user interface element is actuatable.

In a further aspect, the one or more user interface elements comprised in the graphical user interface is displayed in a first location of the touchscreen display, the overlay user input interface is displayed in an area of the touchscreen display comprising the first location, and the at least one of said one or more user interface elements is displayed in a second location of the touchscreen display outside said area. In a further aspect, the first location is proximate a first end of the touchscreen display and the second location is proximate an opposing end of the touchscreen display.

In a further aspect, the overlay user input interface is a virtual keyboard.

In a still further aspect, the at least one user interface element is actuatable to invoke a primary function. The primary function may be determined by detected use of functions associated with the graphical user interface, and may be a most frequently used function associated with the graphical user interface. The primary function may also be determined by correlating at least one state of an application associated with the graphical user interface to a detected input command, and upon invocation of the overlay user input interface, determining a current state of the application, and defining the primary function as an action associated with said current state. Alternatively, the primary function may be determined by correlating at least one detected input command with a state of an application associated with the graphical user interface, and upon invocation of the overlay user input interface, determining a current state of the application, and defining the primary function as a most frequently used action associated with said current state.

There is also provided a method for operating a device comprising a touchscreen display, the method comprising presenting a first graphical user interface at the touchscreen display, the first graphical user interface comprising one or more user interface elements, each said user interface element being actuatable using the touchscreen display to invoke a corresponding function; displaying an overlay user input interface at the touchscreen display such that said one or more user interface elements are not actuatable; and while said overlay user input interface is displayed, displaying a modified graphical user interface at the touchscreen display, wherein at least one of said one or more user interface elements is presented, such that said at least one user interface element is actuatable. The overlay user input interface may be a virtual keyboard, and the user interface element may be actuatable to invoke a primary function.

In a further aspect of the foregoing method, presenting the first graphical user interface comprises displaying the one or more user interface elements in a first location of the touchscreen display, displaying the overlay user input interface comprises displaying the overlay user input interface in an area of the touchscreen display comprising the first location, and in the modified graphical user interface, the at least one of said one or more user interface elements is displayed in a second location of the touchscreen display outside said area.

In still a further aspect of the foregoing method, the first location is proximate a first end of the touchscreen display and the second location is proximate an opposing end of the touchscreen display.

Still further aspects of the foregoing method include determining the primary function by detected use of functions associated with the graphical user interface. The primary function may be a most frequently used function associated with the graphical user interface. The primary function may be determined by correlating at least one state of an application associated with the graphical user interface to a detected input command; and upon invocation of the overlay user input interface, determining a current state of the application, and defining the primary function as an action associated with said current state. In still a further aspect of the method, the primary function is determined by correlating at least one detected input command with a state of an application associated with the graphical user interface; and upon invocation of the overlay user input interface, determining a current state of the application, and defining the primary function as a most frequently used action associated with said current state. The state of the application may comprise an identification of an application view currently displayed and whether data has been input using the graphical user interface.

There is also provided a computer-readable medium comprising computer executable instructions which when executed on one or more processors of a computing system cause the system to carry out the method described herein.

These embodiments will be described in relation to a mobile wireless communication device, hereafter referred to as a communication device. It will be appreciated by those skilled in the art, however, that this description is not intended to limit the scope of the described embodiments to communication devices. The methods and systems described herein may be applied to any appropriate communication or data processing device, whether portable or wirelessly enabled or not, including without limitation cellular phones, smartphones, wireless organizers, personal digital assistants, desktop computers, terminals, laptops, tablets, handheld wireless communication devices, wirelessly-enabled notebook computers and the like, having a touchscreen display. The touchscreen display may be actuatable by the user using the touch of a finger, or alternatively using a stylus or other pointing device. The graphical user interface implemented with the touchscreen display may be configured to respond to different types of touches or contact, such as multi-tap, long press, drag, scroll, and zoom. Such communication devices may also be provided with alternate user input devices such as a touchpad, scroll wheel, trackball, clickable trackball, portable mouse, or joystick that permits the user to position a cursor or other visible indicator on a user display (such as the touchscreen) to actuate and trigger functions represented via a graphical user interface, or permits the focus in an application to move from one focus point to another so as to allow the user to actuate and trigger such functions.

Figure 2:
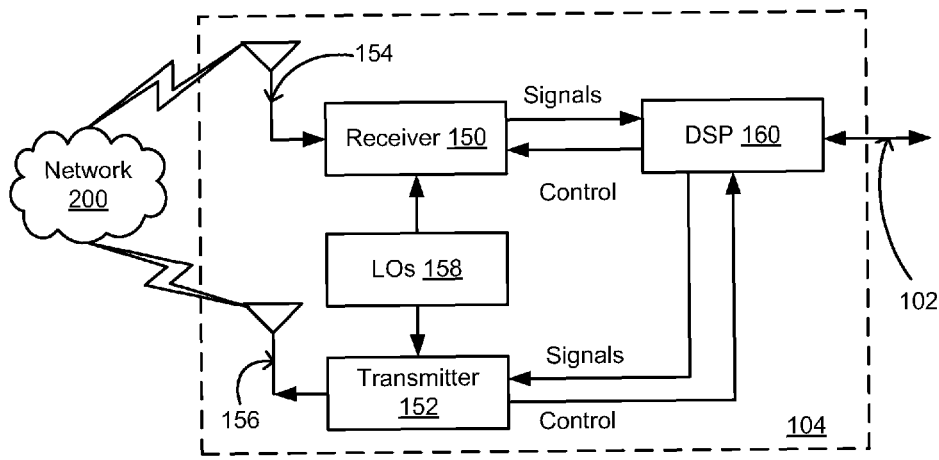
FIG. 2 is a block diagram of an embodiment of a communication subsystem component of the mobile device of FIG. 1.
Figure 3:
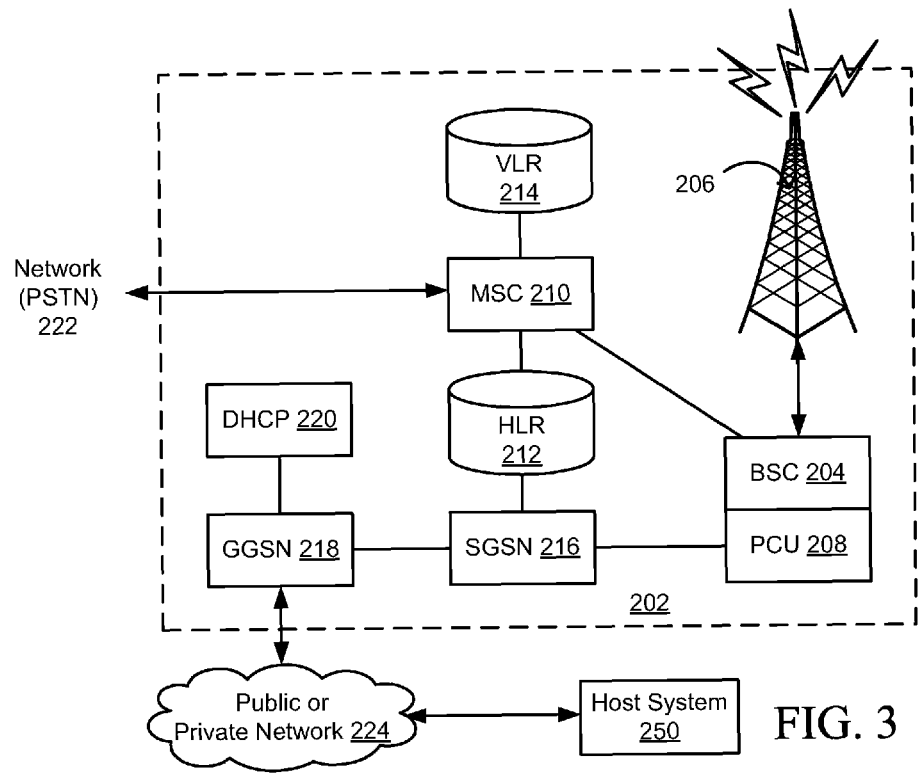
FIG. 3 is an exemplary block diagram of a node of a wireless network for use with the mobile device of FIG. 1.
Figure 4:
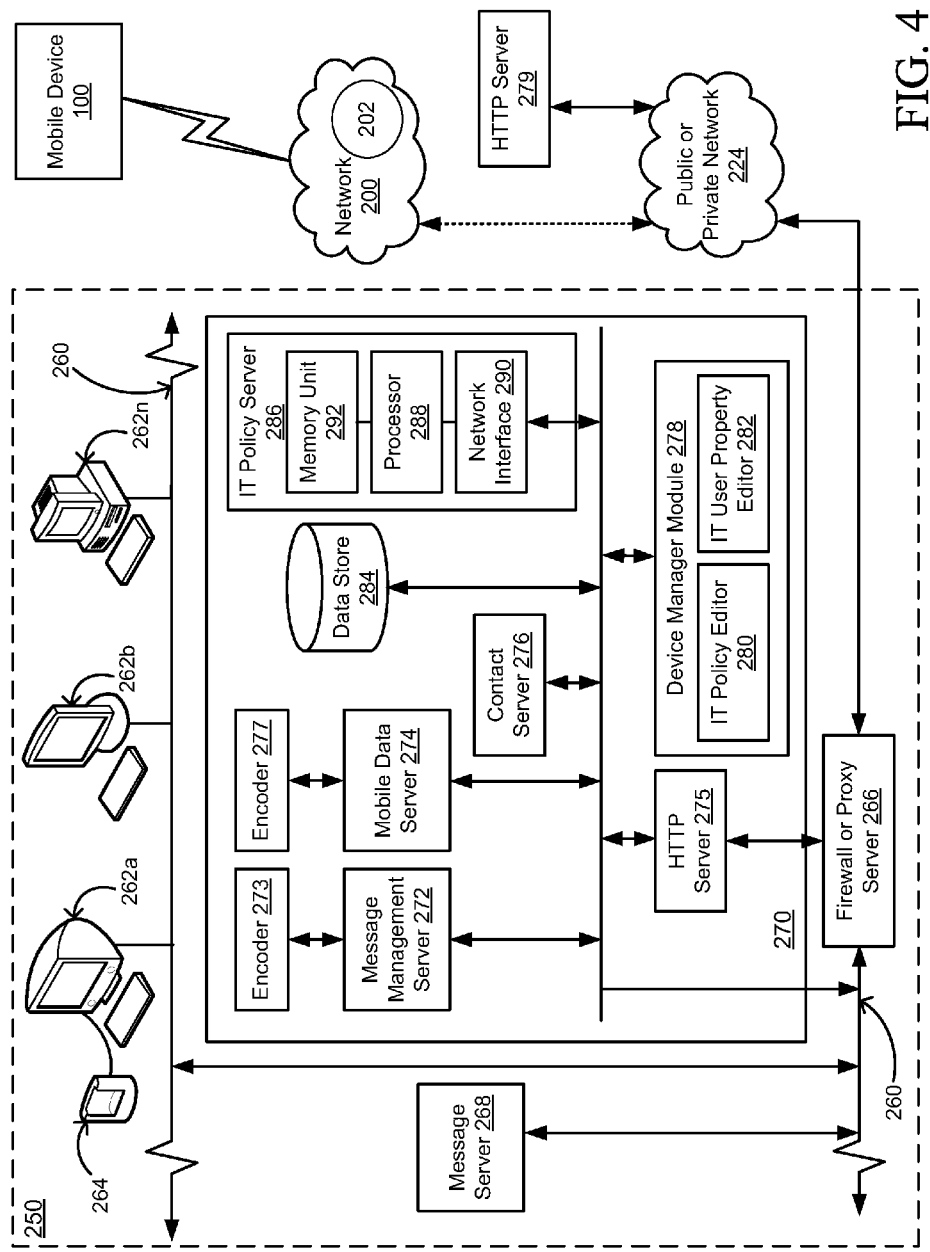
FIG. 4 is a block diagram illustrating components of a host system in one exemplary configuration for use with the wireless network of FIG. 3 and the mobile device of FIG. 1.

The embodiments described herein may be implemented on a communication device such as that illustrated in FIGS. 1 and 2. The communication device may communicate with other devices over a wireless communication system or enterprise system as illustrated in FIGS. 3 and 4. The communication device 100 may be a mobile device with two-way communication and advanced data communication capabilities including the capability to communicate with other mobile devices or computer systems through a network of transceiver stations. The communication device 100 can also have voice communication capabilities. Throughout the specification, terms such as "may" and "can" are used interchangeably and use of any particular term should not be construed as limiting the scope or requiring experimentation to implement the claimed subject matter or embodiments described herein.

FIG. 1 is a block diagram of an exemplary embodiment of a communication device 100. The communication device 100 includes a number of components such as a main processor 102 that controls the overall operation of the communication device 100. Communication functions, including data and voice communications, are performed through a communication subsystem 104. Data received by the communication device 100 can be decompressed and decrypted by decoder 103, operating according to any suitable decompression techniques, and encryption/decryption techniques according to various standards, such as Data Encryption Standard (DES), Triple DES, or Advanced Encryption Standard (AES)). Image data is typically compressed and decompressed in accordance with appropriate standards, such as JPEG, while video data is typically compressed and decompressed in accordance with appropriate standards, such as H.26x and MPEG-x series standards.

The communication subsystem 104 receives messages from and sends messages to a wireless network 200. In this exemplary embodiment of the communication device 100, the communication subsystem 104 is configured in accordance with one or more of Global System for Mobile Communication (GSM), General Packet Radio Services (GPRS) standards, Enhanced Data GSM Environment (EDGE) and Universal Mobile Telecommunications Service (UMTS). New standards are still being defined, but it is believed that they will have similarities to the network behavior described herein, and it will also be understood by persons skilled in the art that the embodiments described herein are intended to use any other suitable standards that are developed in the future. The wireless link connecting the communication subsystem 104 with the wireless network 200 represents one or more different Radio Frequency (RF) channels, operating according to defined protocols specified for GSM, GPRS, EDGE, or UMTS, and optionally other network communications. With newer network protocols, these channels are capable of supporting both circuit switched voice communications and packet switched data communications.

Other wireless networks can also be associated with the communication device 100 in variant implementations. The different types of wireless networks that can be employed include, for example, data-centric wireless networks, voice-centric wireless networks, and dual-mode networks that can support both voice and data communications over the same physical base stations. Combined dual-mode networks include, but are not limited to, Code Division Multiple Access (CDMA) or CDMA2000 networks, GSM/GPRS networks, third-generation (3G) networks like EDGE, HSPA, HSPA+, EVDO and UMTS, or fourth-generation (4G) networks such as LTE and LTE Advanced. Some other examples of data-centric networks include WiFi 802.11™, Mobitex™ and DataTAC™ network communication systems. Examples of other voice-centric data networks include Personal Communication Systems (PCS) networks like GSM and Time Division Multiple Access (TDMA) systems. The mobile device 100 may be provided with additional communication subsystems, such as the wireless LAN (WLAN) communication subsystem 105 also shown in FIG. 1. The WLAN communication subsystem may operate in accordance with a known network protocol such as one or more of the 802.11™ family of standards developed by IEEE. The communication subsystem 105 may be separate from, or integrated with, the communication subsystem 104 or with the short-range communications module 122. The main processor 102 also interacts with additional subsystems such as a Random Access Memory (RAM) 106, a flash memory 108, a display 110, an auxiliary input/output (I/O) subsystem 112, a data port 114, a keyboard 116, a speaker 118, a microphone 120, short-range communications 122 and other device subsystems 124. The communication device may also be provided with an accelerometer 111, which may be used to detect gravity- or motion-induced forces and their direction. Detection of such forces applied to the device 100 may be processed to determine a response of the device 100, such as an orientation of a graphical user interface displayed on the display assembly 110 in response to a determination of the current orientation of which the device 100.

Some of the subsystems of the communication device 100 perform communication-related functions, whereas other subsystems can provide "resident" or on-device functions. By way of example, the display 110 and the keyboard 116 can be used for both communication-related functions, such as entering a text message for transmission over the network 200, and device-resident functions such as a calculator or task list.

A rendering circuit 125 is included in the device 100. When a user specifies that a data file is to be viewed on the display 110, the rendering circuit 125 analyzes and processes the data file for visualization on the display 110. Rendering data files originally optimized or prepared for visualization on large-screen displays on a portable electronic device display often requires additional processing prior to visualization on the small-screen portable electronic device displays. This additional processing may be accomplished by the rendering engine 125. As will be appreciated by those of skill in the art, the rendering engine can be implemented in hardware, software, or a combination thereof, and can comprise a dedicated image processor and associated circuitry, or can be implemented within main processor 102.

The communication device 100 can send and receive communication signals over the wireless network 200 after required network registration or activation procedures have been completed. Network access is associated with a subscriber or user of the communication device 100. To identify a subscriber, the communication device 100 requires a SIM/RUIM card 126 (i.e. Subscriber Identity Module or a Removable User Identity Module) to be inserted into a SIM/RUIM interface 128 in order to communicate with a network. The SIM/RUIM card 126 is one type of a conventional "smart card" that can be used to identify a subscriber of the communication device 100 and to personalize the communication device 100, among other things. Without the SIM/RUIM card 126, the communication device 100 is not fully operational for communication with the wireless network 200. By inserting the SIM/RUIM card 126 into the SIM/RUIM interface 128, a subscriber can access all subscribed services. Services can include: web browsing and messaging such as e-mail, voice mail, Short Message Service (SMS), and Multimedia Messaging Services (MMS). More advanced services can include: point of sale, field service and sales force automation. The SIM/RUIM card 126 includes a processor and memory for storing information. Once the SIM/RUIM card 126 is inserted into the SIM/RUIM interface 128, it is coupled to the main processor 102. In order to identify the subscriber, the SIM/RUIM card 126 can include some user parameters such as an International Mobile Subscriber Identity (IMSI). An advantage of using the SIM/RUIM card 126 is that a subscriber is not necessarily bound by any single physical mobile device. The SIM/RUIM card 126 can store additional subscriber information for a mobile device as well, including datebook (or calendar) information and recent call information. Alternatively, user identification information can also be programmed into the flash memory 108.

The communication device 100 may be a battery-powered device including a battery interface 132 for receiving one or more rechargeable batteries 130. In at least some embodiments, the battery 130 can be a smart battery with an embedded microprocessor. The battery interface 132 is coupled to a regulator (not shown), which assists the battery 130 in providing power V+ to the communication device 100. Although current technology makes use of a battery, future technologies such as micro fuel cells can provide the power to the communication device 100.

The communication device 100 also includes an operating system 134 and software components 136 to 146 which are described in more detail below. The operating system 134 and the software components 136 to 146 that are executed by the main processor 102 are typically stored in a persistent store such as the flash memory 108, which can alternatively be a read-only memory (ROM) or similar storage element (not shown). Those skilled in the art will appreciate that portions of the operating system 134 and the software components 136 to 146, such as specific device applications, or parts thereof, can be temporarily loaded into a volatile store such as the RAM 106. Other software components can also be included, as is well known to those skilled in the art.

The subset of software applications 136 that control basic device operations, including data and voice communication applications, will normally be installed on the communication device 100 during its manufacture. Other software applications include a message application 138 that can be any suitable software program that allows a user of the communication device 100 to send and receive electronic messages. Various alternatives exist for the message application 138 as is well known to those skilled in the art. Messages that have been sent or received by the user are typically stored in the flash memory 108 of the communication device 100 or some other suitable storage element in the communication device 100. In at least some embodiments, some of the sent and received messages can be stored remotely from the device 100 such as in a data store of an associated host system that the communication device 100 communicates with.

The software applications can further include a device state module 140, a Personal Information Manager (PIM) 142, and other suitable modules (not shown). The device state module 140 provides persistence, i.e. the device state module 140 ensures that important device data is stored in persistent memory, such as the flash memory 108, so that the data is not lost when the communication device 100 is turned off or loses power.

The PIM 142 includes functionality for organizing and managing data items of interest to the user, such as, but not limited to, e-mail, contacts, calendar events, voice mails, appointments, and task items. A PIM application has the ability to send and receive data items via the wireless network 200. PIM data items can be seamlessly integrated, synchronized, and updated via the wireless network 200 with the mobile device subscriber's corresponding data items stored and/or associated with a host computer system. This functionality creates a mirrored host computer on the communication device 100 with respect to such items. This can be particularly advantageous when the host computer system is the mobile device subscriber's office computer system. Some or all of the data items stored at the communication device 100 may be indexed for searching on the device 100 either through a corresponding application, such as the PIM 142, or another suitable module. In addition, the items may be searchable using a unified search process implemented in the device operating system 134. For example, application data items can be encapsulated in a searchable entity class and registered with a unified search engine on the device 100 that executes searches against all registered data repositories on the device based on received queries. The search engine can also be configured to invoke a search process of external resources, such as Internet search engines or remote databases.

The communication device 100 also includes a connect module 144, and an information technology (IT) policy module 146. The connect module 144 implements the communication protocols that are required for the communication device 100 to communicate with the wireless infrastructure and any host system, such as an enterprise system, that the communication device 100 is authorized to interface with. Examples of a wireless infrastructure and an enterprise system are given in FIGS. 3 and 4, which are described in more detail below.

The connect module 144 includes a set of Application Programming Interfaces (APIs) that can be integrated with the communication device 100 to allow the communication device 100 to use any number of services associated with the enterprise system or with other systems accessible over the network 200. The connect module 144 allows the communication device 100 to establish an end-to-end secure, authenticated communication pipe with the host system. A subset of applications for which access is provided by the connect module 144 can be used to pass IT policy commands from the host system to the communication device 100. This can be done in a wireless or wired manner. These instructions can then be passed to the IT policy module 146 to modify the configuration of the device 100. Alternatively, in some cases, the IT policy update can also be done over a wired connection.

Other types of software applications can also be installed on the communication device 100. These software applications can be third party applications, which are added after the manufacture of the communication device 100. Examples of third party applications include games, calculators, utilities, etc.

The additional applications can be loaded onto the communication device 100 through at least one of the wireless network 200, the auxiliary I/O subsystem 112, the data port 114, the short-range communications subsystem 122, or any other suitable device subsystem 124. This flexibility in application installation increases the functionality of the communication device 100 and can provide enhanced on-device functions, communication-related functions, or both. For example, secure communication applications can enable electronic commerce functions and other such financial transactions to be performed using the communication device 100.

The data port 114 enables a subscriber to set preferences through an external device or software application and extends the capabilities of the communication device 100 by providing for information or software downloads to the communication device 100 other than through a wireless communication network. The alternate download path can, for example, be used to load an encryption key onto the communication device 100 through a direct and thus reliable and trusted connection to provide secure device communication. The data port 114 can be any suitable port that enables data communication between the communication device 100 and another computing device. The data port 114 can be a serial or a parallel port. In some instances, the data port 114 can be a USB port that includes data lines for data transfer and a supply line that can provide a charging current to charge the battery 130 of the communication device 100.

The short-range communications subsystem 122 provides for communication between the communication device 100 and different systems or devices, without the use of the wireless network 200. For example, the subsystem 122 can include an infrared device and associated circuits and components for short-range communication. Examples of short-range communication standards include standards developed by the Infrared Data Association (IrDA), Bluetooth™, and the 802.11™ family of standards developed by IEEE.

In use, a received signal such as a text message, an e-mail message, or web page download will be processed by the communication subsystem 104 and input to the main processor 102. The main processor 102 will then process the received signal for output to the display 110 or alternatively to the auxiliary I/O subsystem 112. A subscriber can also compose data items, such as e-mail messages, for example, using the keyboard 116 in conjunction with the display 110 and possibly the auxiliary I/O subsystem 112. The auxiliary subsystem 112 can include devices such as: a touchscreen, mouse, track ball, infrared fingerprint detector, or a roller wheel with dynamic button pressing capability. The keyboard 116 is preferably an alphanumeric keyboard and/or telephone-type keypad. However, other types of keyboards can also be used. A composed item can be transmitted over the wireless network 200 through the communication subsystem 104. It will be appreciated that if the display 110 comprises a touchscreen which provides both an interface both for displaying information and presenting graphical user interfaces, and an input subsystem for detecting user input that may be converted to instructions for execution by the device 100, then the auxiliary subsystem 112 may still comprise one or more of the devices identified above.

In a touchscreen device, the device 100 may comprise a housing in which the display 110 is mounted. Generally, construction of the touchscreen and its implementation in the communication device 100 will be understood by those skilled in the art. Examples in the art include commonly-owned U.S. Patent Application Publication Nos. 2004/0155991, 2009/0244013, 2010/0128002 and 2010/0156843, the entireties of which are herein incorporated by reference. Briefly, a touch-sensitive display may comprise suitable touch-sensitive screen technology, such as a capacitive, resistive, infrared, surface acoustic wave (SAW) touch-sensitive display, strain gauge, optical imaging, dispersive signal technology, acoustic pulse recognition, and so forth, as known in the art. The touchscreen display 110 may comprise an assembly of multiple layers including a substrate, ground shield layer, barrier layer, one or more capacitive touch sensor layers separated by a substrate or other barrier, and a cover. An example of such a touchscreen display 110 is described in aforementioned U.S. Patent Application No. 2010/0128002. Optionally, the device 100 may also provide haptic or tactile feedback through the housing of the device 100, or through the touchscreen itself.

In one embodiment, a transmissive TFT LCD screen is overlaid with a clear touch sensor assembly that supports single and multi-touch actions such as tap, double-tap, tap and hold, tap and drag, scroll, press, flick, and pinch. The touchscreen display 110 detects these single and multi-touch actions, for example through the generation of a signal or signals in response to a touch, which may then be processed by the processor 102 or by an additional processor or processors in the device 100 to determine the location of the touch action, whether defined by horizontal and vertical screen position data or other position data. The touchscreen display 110 may be provided with separate horizontal and vertical sensors or detectors to assist in identifying the location of a touch. The detected touch actions are then correlated both to user commands and to an element or elements displayed on the display screen comprised in the display 110. Thus, in response to the correlated user command, the processor can execute an action in respect of the identified element or elements. Touches that are capable of being detected may be made by various contact objects, such as thumbs, fingers, styli, pens, pointers and the like, although the selection of the appropriate contact object and its construction will depend on the type of touchscreen display 110 implemented on the device. Depending on the technology selected for the touchscreen display 110, the display 110, by itself, may be configured to detect contact events on its surface irrespective of the degree of pressure applied at the time of contact.

Pressure events, and varying degrees of pressure applied to the touchscreen display 110, may be detected using force sensors (not shown), which are disposed beneath the display 110. The construction and implementation of the force sensors will also be understood by those skilled in the art. The force sensor or sensors may include force-sensitive resistors, strain gauges, capacitive, piezoelectric or piezoresistive devices, pressure sensors, or other suitable devices. For example, each force sensor may comprise a piezoelectric sensor which, when deformed due to force applied through contact by the touchscreen display 110 when pressure is applied to the display surface, transmits an electrical signal to the controller or processor 102. If the signal is determined to be above a predetermined threshold, the signal may be interpreted as application of pressure on the touchscreen display 110 associated with particular actions or responses at the device 100 (such as actuating a user interface element determined to be located at the point at which the display 110 was depressed). Thus, with a touchscreen display 110 that is sensitive to contact by a contact means, the device 110 may be configured to detect not only contact (i.e., comparatively light pressure) at the touchscreen 110 surface using an overlying touch sensing layer, but also heavier pressure applied to the touchscreen 110 using the one or more force sensors.

For voice communications, the overall operation of the communication device 100 is substantially similar, except that the received signals are output to the speaker 118, and signals for transmission are generated by the microphone 120. Alternative voice or audio I/O subsystems, such as a voice message recording subsystem, can also be implemented on the communication device 100. Although voice or audio signal output is accomplished primarily through the speaker 118, the display 110 can also be used to provide additional information such as the identity of a calling party, duration of a voice call, or other voice call related information.

FIG. 2 shows an exemplary block diagram of the communication subsystem component 104. The communication subsystem 104 includes a receiver 150, a transmitter 152, as well as associated components such as one or more embedded or internal antenna elements 154 and 156, Local Oscillators (LOs) 158, and a processing module such as a Digital Signal Processor (DSP) 160. The particular design of the communication subsystem 104 is dependent upon the communication network 200 with which the communication device 100 is intended to operate. Thus, it should be understood that the design illustrated in FIG. 2 serves only as one example.

Signals received by the antenna 154 through the wireless network 200 are input to the receiver 150, which can perform such common receiver functions as signal amplification, frequency down conversion, filtering, channel selection, and analog-to-digital (A/D) conversion. A/D conversion of a received signal allows more complex communication functions such as demodulation and decoding to be performed in the DSP 160. In a similar manner, signals to be transmitted are processed, including modulation and encoding, by the DSP 160. These DSP-processed signals are input to the transmitter 152 for digital-to-analog (D/A) conversion, frequency up conversion, filtering, amplification and transmission over the wireless network 200 via the antenna 156. The DSP 160 not only processes communication signals, but also provides for receiver and transmitter control. For example, the gains applied to communication signals in the receiver 150 and the transmitter 152 can be adaptively controlled through automatic gain control algorithms implemented in the DSP 160.

The wireless link between the communication device 100 and the wireless network 200 can contain one or more different channels, typically different RF channels, and associated protocols used between the communication device 100 and the wireless network 200. An RF channel is a limited resource that should be conserved, typically due to limits in overall bandwidth and limited battery power of the communication device 100. When the communication device 100 is fully operational, the transmitter 152 is typically keyed or turned on only when it is transmitting to the wireless network 200 and is otherwise turned off to conserve resources. Similarly, the receiver 150 is periodically turned off to conserve power until it is needed to receive signals or information (if at all) during designated time periods.

FIG. 3 is a block diagram of an exemplary implementation of a node 202 of the wireless network 200. In practice, the wireless network 200 comprises one or more nodes 202. In conjunction with the connect module 144, the communication device 100 can communicate with the node 202 within the wireless network 200. In the exemplary implementation of FIG. 3, the node 202 is configured in accordance with General Packet Radio Service (GPRS) and Global Systems for Mobile (GSM) technologies. The node 202 includes a base station controller (BSC) 204 with an associated tower station 206, a Packet Control Unit (PCU) 208 added for GPRS support in GSM, a Mobile Switching Center (MSC) 210, a Home Location Register (HLR) 212, a Visitor Location Registry (VLR) 214, a Serving GPRS Support Node (SGSN) 216, a Gateway GPRS Support Node (GGSN) 218, and a Dynamic Host Configuration Protocol (DHCP) 220. This list of components is not meant to be an exhaustive list of the components of every node 202 within a GSM/GPRS network, but rather a list of components that are commonly used in communications through the network 200.

In a GSM network, the MSC 210 is coupled to the BSC 204 and to a landline network, such as a Public Switched Telephone Network (PSTN) 222 to satisfy circuit switched requirements. The connection through the PCU 208, the SGSN 216 and the GGSN 218 to a public or private network (Internet) 224 (also referred to herein generally as a shared network infrastructure) represents the data path for GPRS capable mobile devices. In a GSM network extended with GPRS capabilities, the BSC 204 also contains the Packet Control Unit (PCU) 208 that connects to the SGSN 216 to control segmentation, radio channel allocation and to satisfy packet switched requirements. To track the location of the communication device 100 and availability for both circuit switched and packet switched management, the HLR 212 is shared between the MSC 210 and the SGSN 216. Access to the VLR 214 is controlled by the MSC 210.

The station 206 is a fixed transceiver station and together with the BSC 204 form fixed transceiver equipment. The fixed transceiver equipment provides wireless network coverage for a particular coverage area commonly referred to as a "cell". The fixed transceiver equipment transmits communication signals to and receives communication signals from mobile devices within its cell via the station 206. The fixed transceiver equipment normally performs such functions as modulation and possibly encoding and/or encryption of signals to be transmitted to the communication device 100 in accordance with particular, usually predetermined, communication protocols and parameters, under control of its controller. The fixed transceiver equipment similarly demodulates and possibly decodes and decrypts, if necessary, any communication signals received from the communication device 100 within its cell. Communication protocols and parameters can vary between different nodes. For example, one node can employ a different modulation scheme and operate at different frequencies than other nodes.

For all communication devices 100 registered with a specific network, permanent configuration data such as a user profile is stored in the HLR 212. The HLR 212 also contains location information for each registered mobile device and can be queried to determine the current location of a mobile device. The MSC 210 is responsible for a group of location areas and stores the data of the mobile devices currently in its area of responsibility in the VLR 214. Further, the VLR 214 also contains information on mobile devices that are visiting other networks. The information in the VLR 214 includes part of the permanent mobile device data transmitted from the HLR 212 to the VLR 214 for faster access. By moving additional information from a remote HLR 212 node to the VLR 214, the amount of traffic between these nodes can be reduced so that voice and data services can be provided with faster response times and at the same time requiring less use of computing resources.

The SGSN 216 and the GGSN 218 are elements added for GPRS support; namely packet switched data support, within GSM. The SGSN 216 and the MSC 210 have similar responsibilities within the wireless network 200 by keeping track of the location of each communication device 100. The SGSN 216 also performs security functions and access control for data traffic on the wireless network 200. The GGSN 218 provides internetworking connections with external packet switched networks and connects to one or more SGSNs 216 via an Internet Protocol (IP) backbone network operated within the network 200. During normal operations, a given communication device 100 must perform a "GPRS Attach" to acquire an IP address and to access data services. This requirement is not present in circuit switched voice channels as Integrated Services Digital Network (ISDN) addresses are used for routing incoming and outgoing calls. Currently, all GPRS capable networks use private, dynamically assigned IP addresses, thus requiring the DHCP server 220 connected to the GGSN 218. There are many mechanisms for dynamic IP assignment, including using a combination of a Remote Authentication Dial-In User Service (RADIUS) server and a DHCP server. Once the GPRS Attach is complete, a logical connection is established from a communication device 100, through the PCU 208, and the SGSN 216 to an Access Point Node (APN) within the GGSN 218. The APN represents a logical end of an IP tunnel that can either access direct Internet compatible services or private network connections. The APN also represents a security mechanism for the network 200, insofar as each communication device 100 must be assigned to one or more APNs and communication devices 100 cannot exchange data without first performing a GPRS Attach to an APN that it has been authorized to use. The APN can be considered to be similar to an Internet domain name such as "myconnection.wireless.com".

Once the GPRS Attach operation is complete, a tunnel is created and all traffic is exchanged within standard IP packets using any protocol that can be supported in IP packets. This includes tunneling methods such as IP over IP as in the case with some IPSecurity (Ipsec) connections used with Virtual Private Networks (VPN). These tunnels are also referred to as Packet Data Protocol (PDP) Contexts and there are a limited number of these available in the network 200. To maximize use of the PDP Contexts, the network 200 will run an idle timer for each PDP Context to determine if there is a lack of activity. When a communication device 100 is not using its PDP Context, the PDP Context can be de-allocated and the IP address returned to the IP address pool managed by the DHCP server 220.

FIG. 4 is a block diagram illustrating components of an exemplary configuration of a host system 250 with which the communication device 100 can communicate in conjunction with the connect module 144. The host system 250 will typically be a corporate enterprise or other local area network (LAN), but can also be a home office computer or some other private system, for example, in variant implementations. In the example shown in FIG. 4, the host system 250 is depicted as a LAN of an organization to which a user of the communication device 100 belongs. Typically, a plurality of mobile devices can communicate wirelessly with the host system 250 through one or more nodes 202 of the wireless network 200.

The host system 250 comprises a number of network components connected to each other by a network 260. For instance, a user's desktop computer 262*a* with an accompanying cradle 264 for the user's communication device 100 is situated on a LAN connection. The cradle 264 for the communication device 100 can be coupled to the computer 262*a* by a serial or a Universal Serial Bus (USB) connection, for example. Other user computers 262*b*-262*n* are also situated on the network 260, and each can be equipped with an accompanying cradle 264. The cradle 264 facilitates the loading of information (e.g. PIM data, private symmetric encryption keys to facilitate secure communications) from the user computer 262*a* to the communication device 100, and can be particularly useful for bulk information updates often performed in initializing the communication device 100 for use. The information downloaded to the communication device 100 can include certificates used in the exchange of messages.

It will be understood by persons skilled in the art that the user computers 262*a*-262*n* are typically also connected to other peripheral devices, such as printers, etc., which are not explicitly shown in FIG. 4. Furthermore, only a subset of network components of the host system 250 are shown in FIG. 4 for ease of exposition, and it will be understood by persons skilled in the art that the host system 250 will comprise additional components that are not explicitly shown in FIG. 4 for this exemplary configuration. More generally, the host system 250 can represent a smaller part of a larger network (not shown) of the organization, and can comprise different components and/or be arranged in different topologies than that shown in the exemplary embodiment of FIG. 4.

To facilitate the operation of the communication device 100 and the wireless communication of messages and message-related data between the communication device 100 and components of the host system 250, a number of wireless communication support components 270 can be provided. In some implementations, the wireless communication support components 270 can include a message management server 272, a mobile data server 274, a web server, such as Hypertext Transfer Protocol (HTTP) server 275, a contact server 276, and a device manager module 278. HTTP servers can also be located outside the enterprise system, as indicated by the HTTP server 279 attached to the network 224. The device manager module 278 includes an IT Policy editor 280 and an IT user property editor 282, as well as other software components for allowing an IT administrator to configure the communication devices 100. In an alternative embodiment, there can be one editor that provides the functionality of both the IT policy editor 280 and the IT user property editor 282. The support components 270 also include a data store 284, and an IT policy server 286. The IT policy server 286 includes a processor 288, a network interface 290 and a memory unit 292. The processor 288 controls the operation of the IT policy server 286 and executes functions related to the standardized IT policy as described below. The network interface 290 allows the IT policy server 286 to communicate with the various components of the host system 250 and the communication devices 100. The memory unit 292 can store functions used in implementing the IT policy as well as related data. Those skilled in the art know how to implement these various components. Other components can also be included as is well known to those skilled in the art. Further, in some implementations, the data store 284 can be part of any one of the servers.

In this exemplary embodiment, the communication device 100 communicates with the host system 250 through node 202 of the wireless network 200 and a shared network infrastructure 224 such as a service provider network or the public Internet. Access to the host system 250 can be provided through one or more routers (not shown), and computing devices of the host system 250 can operate from behind a firewall or proxy server 266. The proxy server 266 provides a secure node and a wireless internet gateway for the host system 250. The proxy server 266 intelligently routes data to the correct destination server within the host system 250.

In some implementations, the host system 250 can include a wireless VPN router (not shown) to facilitate data exchange between the host system 250 and the communication device 100. The wireless VPN router allows a VPN connection to be established directly through a specific wireless network to the communication device 100. The wireless VPN router can be used with the Internet Protocol (IP) Version 6 (IPV6) and IP-based wireless networks. This protocol can provide enough IP addresses so that each mobile device has a dedicated IP address, making it possible to push information to a mobile device at any time. An advantage of using a wireless VPN router is that it can be an off-the-shelf VPN component, and does not require a separate wireless gateway and separate wireless infrastructure. A VPN connection can preferably be a Transmission Control Protocol (TCP)/IP or User Datagram Protocol (UDP)/IP connection for delivering the messages directly to the communication device 100 in this alternative implementation.

Messages intended for a user of the communication device 100 are initially received by a message server 268 of the host system 250. Such messages can originate from any number of sources. For instance, a message can have been sent by a sender from the computer 262*b* within the host system 250, from a different mobile device (not shown) connected to the wireless network 200 or a different wireless network, or from a different computing device, or other device capable of sending messages, via the shared network infrastructure 224, possibly through an application service provider (ASP) or Internet service provider (ISP), for example.

The message server 268 typically acts as the primary interface for the exchange of messages, particularly e-mail messages, within the organization and over the shared network infrastructure 224. Each user in the organization that has been set up to send and receive messages is typically associated with a user account managed by the message server 268. Some exemplary implementations of the message server 268 include a Microsoft Exchange™ server, a Lotus Domino™ server, a Novell Groupwise™ server, or another suitable mail server installed in a corporate environment. In some implementations, the host system 250 can comprise multiple message servers 268. The message server 268 can also be adapted to provide additional functions beyond message management, including the management of data associated with calendars and task lists, for example.

When messages are received by the message server 268, they are typically stored in a data store associated with the message server 268. In at least some embodiments, the data store can be a separate hardware unit, such as data store 284, with which the message server 268 communicates. Messages can be subsequently retrieved and delivered to users by accessing the message server 268. For instance, an e-mail client application operating on a user's computer 262a can request the e-mail messages associated with that user's account stored on the data store associated with the message server 268. These messages are then retrieved from the data store and stored locally on the computer 262a. The data store associated with the message server 268 can store copies of each message that is locally stored on the communication device 100. Alternatively, the data store associated with the message server 268 can store all of the messages for the user of the communication device 100 and only a smaller number of messages can be stored on the communication device 100 to conserve memory. For instance, the most recent messages (i.e. those received in the past two to three months for example) can be stored on the communication device 100.

When operating the communication device 100, the user may wish to have e-mail messages retrieved for delivery to the communication device 100. The message application 138 operating on the communication device 100 can also request messages associated with the user's account from the message server 268. The message application 138 can be configured (either by the user or by an administrator, possibly in accordance with an organization's IT policy) to make this request at the direction of the user, at some pre-defined time interval, or upon the occurrence of some pre-defined event. In some implementations, the communication device 100 is assigned its own e-mail address, and messages addressed specifically to the communication device 100 are automatically redirected to the communication device 100 as they are received by the message server 268.

The message management server 272 can be used to specifically provide support for the management of messages, such as e-mail messages, that are to be handled by mobile devices. Generally, while messages are still stored on the message server 268, the message management server 272 can be used to control when, if, and how messages are sent to the communication device 100. The message management server 272 also facilitates the handling of messages composed on the communication device 100, which are sent to the message server 268 for subsequent delivery.

For example, the message management server 272 can monitor the user's "mailbox" (e.g. the message store associated with the user's account on the message server 268) for new e-mail messages, and apply user-definable filters to new messages to determine if and how the messages are relayed to the user's communication device 100. The message management server 272 can also, through an encoder (not shown) associated therewith, compress message data, using any suitable compression/decompression technology (e.g. YK compression, JPEG, MPEG-x, H.26x, and other known techniques) and encrypt messages (e.g. using an encryption technique such as Data Encryption Standard (DES), Triple DES, or Advanced Encryption Standard (AES)), and push them to the communication device 100 via the shared network infrastructure 224 and the wireless network 200. The message management server 272 can also receive messages composed on the communication device 100 (e.g. encrypted using Triple DES), decrypt and decompress the composed messages, re-format the composed messages if desired so that they will appear to have originated from the user's computer 262a, and re-route the composed messages to the message server 268 for delivery.

Certain properties or restrictions associated with messages that are to be sent from and/or received by the communication device 100 can be defined (e.g. by an administrator in accordance with IT policy) and enforced by the message management server 272. These may include whether the communication device 100 can receive encrypted and/or signed messages, minimum encryption key sizes, whether outgoing messages must be encrypted and/or signed, and whether copies of all secure messages sent from the communication device 100 are to be sent to a pre-defined copy address, for example.

The message management server 272 can also be adapted to provide other control functions, such as only pushing certain message information or pre-defined portions (e.g. "blocks") of a message stored on the message server 268 to the communication device 100. For example, in some cases, when a message is initially retrieved by the communication device 100 from the message server 268, the message management server 272 can push only the first part of a message to the communication device 100, with the part being of a pre-defined size (e.g. 2 KB). The user can then request that more of the message be delivered in similar-sized blocks by the message management server 272 to the communication device 100, possibly up to a maximum pre-defined message size. Accordingly, the message management server 272 facilitates better control over the type of data and the amount of data that is communicated to the communication device 100, and can help to minimize potential waste of bandwidth or other resources.

The mobile data server 274 encompasses any other server that stores information that is relevant to the corporation. The mobile data server 274 can include, but is not limited to, databases, online data document repositories, customer relationship management (CRM) systems, or enterprise resource planning (ERP) applications. The mobile data server 274 can also connect to the Internet or other public network, through HTTP server 275 or other suitable web server such as a File Transfer Protocol (FTP) server, to retrieve HTTP webpages and other data. Requests for webpages are typically routed through mobile data server 274 and then to HTTP server 275, through suitable firewalls and other protective mechanisms. The web server then retrieves the webpage over the Internet, and returns it to mobile data server 274. As described above in relation to message management server 272, mobile data server 274 is typically provided, or associated, with an encoder 277 that permits retrieved data, such as retrieved webpages, to be decompressed and compressed, using any suitable compression technology (e.g. YK compression, JPEG, MPEG-x, H.26x and other known techniques), and encrypted (e.g. using an encryption technique such as DES, Triple DES, or AES), and then pushed to the communication device 100 via the shared network infrastructure 224 and the wireless network 200. While encoder 277 is only shown for mobile data server 274, it will be appreciated that each of message server 268, message management server 272, and HTTP servers 275 and 279 can also have an encoder associated therewith.

The contact server 276 can provide information for a list of contacts for the user in a similar fashion as the address book on the communication device 100. Accordingly, for a given contact, the contact server 276 can include the name, phone number, work address and e-mail address of the contact, among other information. The contact server 276 can also provide a global address list that contains the contact information for all of the contacts associated with the host system 250.

It will be understood by persons skilled in the art that the message management server 272, the mobile data server 274, the HTTP server 275, the contact server 276, the device manager module 278, the data store 284 and the IT policy server 286 do not need to be implemented on separate physical servers within the host system 250. For example, some or all of the functions associated with the message management server 272 can be integrated with the message server 268, or some other server in the host system 250. Alternatively, the host system 250 can comprise multiple message management servers 272, particularly in variant implementations where a large number of mobile devices need to be supported.

The device manager module 278 provides an IT administrator with a graphical user interface with which the IT administrator interacts to configure various settings for the communication devices 100. As mentioned, the IT administrator can use IT policy rules to define behaviors of certain applications on the communication device 100 that are permitted such as phone, web browser or Instant Messenger use. The IT policy rules can also be used to set specific values for configuration settings that an organization requires on the communication devices 100 such as auto signature text, WLAN/VoIP/VPN configuration, security requirements (e.g. encryption algorithms, password rules, etc.), specifying themes or applications that are allowed to run on the communication device 100, and the like.

Applications executing on the communication device 100 often necessitate text input from a user, for example for the purpose of composing messages such as electronic mail (e-mail), short message service (SMS) messages, instant messages (IM) and the like, or for inputting data, whether for the purpose of entering information for storage at or transmission from the device 100 such as address book contacts, notes, task lists, and also while browsing the web, or for the purpose of inputting a command to cause the device 100 to execute a function, such as searching for content or initiating a transmission from the device. For example, to search for an address book contact, the user can enter one or more alphanumeric characters in an input field, which can then be used to filter entries in an address book data store for display in a user interface. Similarly, text input is generally required to enter or edit an address book entry at the device 100. Text input from a user may also be required for other applications and functions such as notes, task lists, and browsing the World Wide Web or other resources over a network connection using a browser client.

While the communication device may be provided with additional physical user input means such as keyboards, trackballs, touchpads, and scroll wheels, on a device equipped with a touchscreen interface, the device's operating system or applications may be configured to present the user with a virtual keyboard via the touchscreen display when a text entry area of an application or webpage is in focus. The virtual keyboard, when invoked in an application, may include keys or buttons actuatable by a user's touch or press with a finger, stylus, or other pointer, as described above. These keys or buttons may represent a complete or partial set of alphanumeric characters and punctuation laid out in arrangements similar to a conventional "QWERTY" layout, or in specialized keyboard layouts designed for use on smaller devices such as smartphones.

FIG. 5A depicts an exemplary virtual keyboard 530 that may be implemented in a graphical user interface 500a displayed on a communication device 100 with a touchscreen display 110. The implementation of the virtual keyboard 530 and its keys, as well as the operation of a graphical user interface with a touchscreen display, is generally known to those skilled in the art. The virtual keyboard 530 includes a plurality of keys or buttons 532, 534, 536, 538, 540, which in this example includes keys representing letters of the alphabet 532; special function keys that may be used to invoke additional user interface displays for entering punctuation, numbers or other symbols 534, 536; a shift key 538; and a return or enter key 540. The keys of the virtual keyboard 530 are generally associated with the functions that conventional keyboard keys are associated with; the return key 540, for example, is typically associated with line breaks and paragraph breaks when used in conjunction with text editing software on a laptop or desktop computer. These various keys are actuatable by the user by touching or pressing the touchscreen display in the location corresponding to the key to invoke an action, such as entering a character corresponding to the key in a data entry field. In the case of a different user interface element displayed on the touchscreen display, actuation of that element may invoke a command or action associated with a currently executing application or the operating system.

It can be seen that in the example of FIG. 5A, the virtual keyboard 530 does not display all possible keys or functions at once, like a physical keyboard. The virtual keyboard 530, in a first view, is provided with lower case letter keys 532. Other characters that may be needed by the user are available through keystroke combinations, or by invoking an alternate view of the virtual keyboard 530. For example, the user may actuate the punctuation/numeric key 534 to change the view of the virtual keyboard to a combination numeric and punctuation keypad (not shown), in which the letter keys are replaced by keys denoting numbers and/or punctuation; actuation of the shift key 538 changes the view of the virtual keyboard 530 to a keypad of upper case letters (also not shown). Actuating the symbol key 536 invokes the display of keys denoting additional symbols. Overall, it will be appreciated that the general configuration of the virtual keyboard 530 and its alternate views reflect the arrangement and function of conventional physical keyboards; for example, the virtual keyboard 530 arranges letters in the same general arrangement as a standard "QWERTY" keyboard, although in the example of FIG. 5A, which shows the graphical user interface 500a displayed in a portrait mode, most letters are paired on a single key to reduce the number of keyboard keys displayed on the touchscreen display 110. If the device 100 is capable of displaying a graphical user interface in landscape mode (not shown), an alternate keyboard arrangement may be implemented to take advantage of the additional width of the display 110, such as a full QWERTY keyboard with a single virtual key corresponding to a single letter. The implementation of other virtual keyboard arrangements will be understood by those skilled in the art, and are considered to be within the scope of this disclosure.

The keyboard 530 thus provides the user with a graphical user interface environment evocative of a traditional, physical keyboard on a communication device 100, even if the device 100 lacks a physical keyboard. However, in a smartphone or similar communication device, the device 100 may provide functionality that other computing devices (e.g., laptop and desktop computers) do not, such as voice and SMS messaging. Applications providing these functions may still require text or keyboard input from the user, but when the typical virtual keyboard such as the keyboard 530 is invoked on the device 100, the layout and the keys of the virtual keyboard may not correspond to the expected functions of the application. The lack of correspondence between the keyboard keys and the available functions of the application executing on the device can be confusing for the user, since it may not be evident that specific keys on the virtual keyboard 530 can be actuated to carry out application-related functions.

For example, FIG. 5B illustrates a phone application user interface 500*b* displayed on a device 100. While the user may simply input, using a numeric keypad (whether virtual or physical), a telephone number to be dialled, in some circumstances the user may wish to search for a telephone number in an address book or contacts data store at the device prior to dialling. The phone application illustrated in FIG. 5B includes a contacts view, invoked when the tab 560 is actuated in the user interface displayed on the device 100. The contacts view includes a data entry area 562, in which may be input an alphanumeric string, which as described above may be used to filter the entries in the address book for display to and selection by the user. The alphanumeric information may be input using the virtual keyboard 530, which may be invoked, for example, when focus is moved to the data entry 562. The user interface 500*b* includes a display area 564, which lists contacts matching the filter defined by the text entered in the data entry area 562. In this example, a list of entries beginning with "A" is displayed in the display area 564, and one particular entry in the list 566 is highlighted. The entry 566 may be highlighted in response to a selection or hover command detected via a user interface, such as the touchscreen display 110.

It can be seen that the keyboard 530 in FIG. 5B has the same keys as in FIG. 5A. Once the user has identified the correct contact in the contact user interface 500*b*, many of the keys of the virtual keyboard 530 may be irrelevant, as no further text entry is necessary; typically, once the contact is found, the next action on the part of the user will be to initiate a dialling function to call the selected contact. On a smartphone device with additional external hardware buttons, one of the external buttons may be configured as a dialling button; once the contact 566 is selected, detection of a button press can initiate a dialling sequence. If there are no such physical buttons on the device 100, as may be the case with a communication device with a touchscreen interface 110, then the user may need to actuate a virtual button or other user interface element via the display 110 to invoke the dialling function. While one or a number of different input gestures could be input by the user to invoke the dialling function, there is nothing apparent from the user interface 500*b* of FIG. 5B to indicate how dialling may be accomplished. For example, the return key 540 in the virtual keyboard 530, while it may be actuatable to invoke dialling, does not readily convey to the user that it may be actuated for that purpose. It is therefore desirable to provide an improved virtual keyboard that is invoked to overlay an application's graphical user interface displayed on a touchscreen display.

As shown in FIG. 6A, a graphical user interface 600*a* with a modified virtual keyboard 630*a* is provided. The interface 600*a* has a similar contacts view to that of FIG. 5B. Again, the interface 600*a* includes a data entry area 622, a list of contacts 624 with one highlighted contact 626, and a modified virtual keyboard 630*a* including an action key 640*a* in place of the return key 540 shown in FIG. 5B. In operation, a user desiring to place a voice call to a contact stored in the address book of the communication device may invoke the contacts view of the telephone application as described above and initiate a search of a contact list or address book. While this could be accomplished by scrolling through a list of all contacts, the user may be provided with the option to search for an individual address book record. To search, the virtual keyboard 630*a* would be invoked, for example by a specific command or by moving a pointer or focus to the data entry area 622. The virtual keyboard, as shown in FIG. 6A, partially overlays the contacts view graphical user interface 600*a* in part, thus potentially overlaying other elements displayed in the graphical user interface 600*a*. With the data entry area 622 in focus, the user can then use the virtual keyboard 630*a* and the touchscreen display 110 to enter one or more characters (e.g., at least a partial name of a target contact) using the virtual keyboard 630*a* to locate a matching address book record. In response to the entry of characters in the data entry area 622, a list of contacts matching the search string is displayed at 624. In this example, a contact is determined to match the input characters if the beginning of the contact's common or friendly name (or alternatively, a contact address) matches the input characters. In response to a user command, received either via the touchscreen display 110 or through another input means, focus may be moved to one of these listed records, so that the user may select one of the listed address book records. Record 626 in the list in FIG. 6A is shown to be highlighted, indicating that it is in focus in the list.

Once the target contact's address book record has been identified in this manner, the virtual keyboard 630*a* may no longer be required by the user. The user may therefore dismiss the keyboard 630*a* by means of an input command, in which case the graphical user interface 600*a* can be redrawn on the display 110 without the keyboard 630*a*, and elements that may have been overlaid by the keyboard 630*a* will again be visible. This additional step of dismissing the keyboard 630*a* thus requires use of device resources to process and re-render the graphical user interface 600*a*, such as the rendering engine 125 and processor 102. Further, select keys of the virtual keyboard 630*a* may be associated with relevant functions for the current view that the user may wish to invoke. This association may not be apparent, given a virtual keyboard of the type depicted in FIG. 5B, because the keys displayed in the virtual keyboard 500 of FIG. 5B are not specific to the telephone application context of FIG. 6A.

Thus, the modified virtual keyboard 630*a* of FIG. 6A provides an action key 640*a*. The action key 640*a* is associated with a function relevant to the current application view, in this case the contacts view of the telephone application. In the example of FIG. 6A, the action key 640*a* is depicted as a "phone" key with an icon or indicator illustrating a telephone handset, and is associated with a telephone calling function. When the action key 640*a* is actuated by the user, a call is placed to the contact whose address book record 626 is highlighted in the graphical user interface 600*a*. The association between the action key 640*a* and its related telephone calling function is easily identifiable by the user, because the icon or indicator provided on action key 640*a* is relevant to the telephone application context.

The embodiment described above thus provides a user with a contextually relevant user interface element, here a key or button provided in a virtual keyboard 630*a*, associated with a function of the application in the context of which the virtual keyboard 630*a* is invoked. In the example of FIG. 6A, the contextually relevant action key 640a replaces the less relevant return key 540 of FIG. 5B. By replacing the return key 540 in this embodiment, the action key 640a, no additional space is required to display the virtual keyboard 630a compared to the keyboard 530. Further, it is not necessary to reduce the size of the individual keys compared to the keyboard 530 to accommodate the action key 640a.

It will be readily appreciated by those skilled in the art that the virtual keyboard 630a may be provided with additional contextually relevant action keys, in addition to or in replacement of other, less relevant keys. Each of said additional contextually relevant keys may be provided with indicia for identifying the application function associated with that key. It will also be appreciated that while the foregoing example has been described in the context of a telephone application and a contacts view, the modified virtual keyboard 630a and action key 640a may be implemented in the context of other applications and other views. For example, when a voice call is in progress, the virtual keyboard 640a may still be displayed in the graphical user interface 600a, if the display 110 remains activated or is activated during the call, but an additional contextually relevant action key associated with disconnecting the call may be implemented in the virtual keyboard 640a.

As another example, in a calendar application, a contextually relevant action key may be a "save" button for saving appointment data to a calendar store on the communication device 100. FIG. 6B illustrates a further graphical user interface 600b comprising an edit screen for creating a new calendar appointment, with various data entry fields 642, 644, 646. In this example, the virtual keyboard 630b is invocable by the user, either upon an input command, or else automatically when focus is moved to one of the fields 642, 644, 646. In place of the return key 540, the virtual keyboard 630b includes a contextually relevant action key, here a save button 640b labelled with an indicator signifying its relevance to the edit user interface 600b. Actuation of the save button 640b may result in the device 100 saving the input data as a calendar event in the calendar data store of the device 100 and dismissing the edit screen as well as the virtual keyboard 640b, or else may simply save the input data without dismissing the edit screen or keyboard 640b.

FIG. 6C illustrates a further example of a search user interface 600c, which may be used to search one or more data stores (e.g., message stores, calendar data stores, and contact data stores) on the device 100. A data entry field 650 is provided for user input of text, which is used to query the various data stores on the device for data entries having content matching the input text. Again, the text may be input using the virtual keyboard 630c, which could be invocable by express user command, or else automatically when focus is moved to the data entry field 650. While the graphical user interface 600c may include a user interface element 655 that may be actuated by the user to initiate a search based on the input text, the position of the contextually relevant action key 640c, which again replaces the return key 540, may be more convenient for the user to access since the user may have been using the keyboard 630b immediately beforehand to enter text for searching.

A process for invoking the virtual keyboard having one or more contextually relevant keys is illustrated in FIG. 6D. At 660, while an application is executing on the device 100 and a graphical user interface is displayed in the context of that application, an instruction is detected to invoke a virtual keyboard. As noted above, this instruction may be the result of an express command by the user to invoke the keyboard, or else the keyboard may be automatically displayed when focus is moved to a select region of the user interface, such as a data entry field. Upon detection of the command, at 670 a virtual keyboard object associated with the user interface screen currently displayed on the device 100 is retrieved, and then displayed at 680.

In addition to the contextually relevant action keys that are provided on a modified virtual keyboard as described above, a graphical user interface on a touchscreen device may include user interface elements such as buttons or user interface controls displayed independently of a virtual keyboard. Turning to FIG. 7A, an exemplary graphical user interface 700a displayed on a display 110 of a communication device 100 is shown. The display 110 may be a touchscreen display. Other possible features of the communication device 100, such as device subsystems 112, are not shown in the figures. The graphical user interface 700a in FIG. 7A depicts an interface for use with a contacts application or function within an address book application, in which a user may enter, edit, or delete contact data stored in an address book or other PIM store on the communication device 100. The interface 700a includes one or more data entry areas 710a, 712a, a banner or status bar 720 indicating the activity represented by the current view of the application and its data in the graphical user interface 700a (here, "Edit Contact"), and one or more user interface elements 725, 726, 727, such as buttons or other virtual controls. These user interface elements 725, 726, 727 may be presented in a "toolbar" form, in this case in a row across a lower region of the display 110, are each associated with a possible action operating on or in relation to content entered in the data entry areas 710a, 712a. Actuating a user interface element 725, 726, 727 triggers the action. One user interface element 725 may represent an action invoking a further user interface, such as a virtual keyboard, for use in entering data in one or more of the data entry areas 710a, 712a. Another user interface element 726 may represent an action of saving data entered in the data entry areas 710a, 712a in the appropriate data store. The third user interface element, 727, represents an action of either discarding changes made to the contact data after the data was last saved, or discarding the contact entry altogether. The user interface elements 725, 726, 727 may be presented in the graphical user interface 700a with icons or other indicia for signifying the related action to the user. Other possible actions and corresponding user interface elements that may be presented in the same screen area of the graphical user interface 700a will be known to those skilled in the art. For example, the horizontal region of the graphical user interface 700a comprising the user interface elements 725, 726, 727 may also comprise other user-actuatable elements corresponding to actions such as "switch application", etc. The user interface elements 725, 726, 727 may be invoked by the application executing on the device whose screen or graphical user interface is in focus. While some or all of these actions may be invoked using a menu system invocable in the graphical user interface 700a, the provision of the user interface elements 725, 726, 727 in the user interface itself—in the example of FIG. 7A, across the bottom of the graphical user interface, and positioned in a location that is likely easily reachable by a user's fingers or thumbs as he or she operates the device 100—permits the user to invoke various commands without taking extra steps to instruct the device 100 to display a menu system.

As can be seen in the examples of FIGS. 5A to 6C, when the virtual keyboard is presented on the display 110, it may overlay content already displayed on the touchscreen display. The virtual keyboard may be partially transparent, allowing at least some of the underlying content to be at least partially visible. However, if the underlying content includes a user interface component of a graphical user interface, such as a virtual button or other control, that component will not longer be actuatable by the user, because it is overlaid by the virtual keyboard and gestures or other input detected at the touchscreen display 110 correlating to that area of the screen will be interpreted as a command actuated on the user interface elements of the virtual keyboard itself. The device and methods described herein therefore provide a solution to the problem of inaccessibility of user interface elements in an application's graphical user interface when an overlay user interface, such as a virtual keyboard, is invoked for use with the data entry features of the application's graphical user interface. By providing for modification of either the overlay user interface or the application graphical user interface, the user interface controls that are most useful to the user remain accessible, even though the standard design of the application graphical user interface or of the device operating system normally positions these user interface controls in the region covered by the overlay user interface.

In a first embodiment, the overlay user interface itself is modified by replacing a virtual key with a primary function key associated with a primary or preferred action for the application. Replacing an existing key of the virtual keyboard avoids the need to increase the screen real estate required by the keyboard when displayed. In a second embodiment, the application graphical user interface is adapted to include a primary function key associated with a primary or preferred action when the overlay user interface is invoked and is displayed in the region normally occupied by the user interface control for that particular action. The application graphical user interface, thus modified, may therefore incorporate a user interface element representative of an operating system-level or application level action that was not previously incorporated in said application graphical user interface.

In the example of FIG. 7A, the user interface element 725 is actuatable to invoke a further user interface, and in particular a virtual keyboard. An example of such a further user interface is shown in FIG. 7B, in which an overlay interface 730 for receiving user input is provided in response to actuation of the user interface element 725. In FIG. 7B, the overlay user input interface or overlay interface 730 is depicted as a virtual keyboard. The virtual keyboard 730 shown in the accompanying drawings is only one example of a possible keyboard layout; a modified "QWERTY" layout such as that shown in the drawings may be implemented, although other keyboard layouts that are known in the art may be used as noted above. It will also be appreciated by those skilled in the art that while the embodiments described herein are shown with a virtual keyboard overlay, the overlay interface 730 may comprise other user touch controls, including but not restricted to virtual numeric keypads, gaming controls, sliders or mixing board controls, touchpads, and the like. The overlay interface 730 may not have user input as a primary function; the overlay interface 730 may instead function primarily as a media display, for example displaying text, still pictures, or video, optionally with accompanying user controls.

The overlay user input interface 730 is enabled and displayed in the graphical user interface 700a either in response to the user actuation of the user interface element 725, or because the application is configured to expect text input by the user, so the device 100 may automatically enable and display the overlay interface 730 upon a predetermined event. The overlay interface 730 may be invoked upon detection that focus has been set on or moved to a data entry area 710b (a cursor 750 in FIG. 7B indicates that focus is currently in the visible data entry area 710b); by another user-actuated instruction; whether input via a gesture or tap on the touchscreen display 110 or a physical key press on the device; or automatically when the application or view within the application is launched.

Once any user input is complete, it is generally expected that the user will wish to save any changes made to the contact entry. Alternatively, the user may wish to discard any changes, delete the record altogether, or carry out another function such as a search. The graphical user interface 700b in FIG. 7B, however, does not include any additional user interface elements for carrying out such activities (save, discard changes, delete, search etc.). On portable communication devices, particularly smartphone and other small form-factor devices, screen area is limited and overlapping of user interface elements may result when further user interfaces are invoked. In FIG. 7B, the overlay interface 730 is displayed in the screen area where the user interface elements 725, 726, 727 and one of the data entry areas 712a of FIG. 7A previously appeared. Even if the overlay interface 730 were partially transparent so that elements of the graphical user interface 700 beneath were visible, those elements would not be actuatable by the user because the overlay interface 730 overlaps those elements, either wholly or partially.

Accordingly, as shown in FIG. 7C, a graphical user interface 700c is provided for the touchscreen display 110 of the communication device 100. The graphical user interface 700c again may comprise a banner or status bar 722, at least one data entry area 710c, and the overlay user input interface 730. In addition, however, the graphical user interface 700c also comprises a primary function user interface element 740, here depicted as a button that may be actuated with a tap or touch via the touchscreen 110. The primary function user interface element 740 is configured to trigger one particular function associated with the application or the current view represented by the user interface 700c. In the example shown in FIG. 7C, the element 740 is a "save" button, which may be actuated to trigger to save the contact record currently displayed in the graphical user interface 740, including any changes made by the user. The element 740 is positioned in the graphical user interface 700c such that it is not overlaid by the overlay interface 730 when the overlay interface 730 is invoked for display in its default location, here positioned across a lower portion of the display 110, such that a portion of the user interface 700b adapted to receive user input, such as the data entry area 710c, is visible. The presentation of the primary function user interface element 740 in this position in FIG. 7C may be accomplished by repositioning other graphical user interface elements, such as the data entry area 710c, which, as can be seen by comparison to the user interface 700b of FIG. 7B, is positioned slightly lower on the display 110 than the data entry area 710b. The distance by which the data entry area 710b is shifted to accommodate the primary function user interface element 740 will depend on the relative size of the primary function user interface element 740, and optionally on the positioning and formatting of other user interface elements in the user interface 700c.

The element 740 thus provides the user with access to a function to which access is typically provided in the graphical user interface 700a, but is temporarily obscured by the overlay interface 730 as shown in FIG. 7B.

The function associated with the primary function user interface element 740 may be predetermined for each application and corresponding view. For example, as shown in FIG. 7C, the predetermined function is the "save" function, which was one of a plurality of functions represented by the user interface elements 725, 726, 727 in FIG. 7A. The identification of the predetermined function may be configured within the application itself, or as a user or administrator-configurable setting for the application or operating system. Each application (e.g., a contacts or PIM data management application, a phone application, e-mail application, and so forth), or view provided by an application (e.g., the contacts view provided in the phone application of FIG. 6A) may have a predetermined primary function user interface element that is automatically displayed whenever the overlay interface 730 is invoked in that application or view.

FIG. 8A, for example, illustrates a graphical user interface 800a for an edit appointment view in a calendar application, again with data entry areas 810a, 812a, and 814a. As with the example of FIG. 7A, the edit appointment user interface 800a includes a series of user interface elements 825, 826, 827, which are actuatable to invoke one of a number of available functions relevant to the data entry functions possible with the user interface 800a: a user interface for invoking a virtual keyboard 825, a save command 826, and a discard or delete command 827. It will be understood by those skilled in the art that it is not necessary to provide a user interface element for expressly invoking the virtual keyboard, as the application or operating system may be configured to automatically invoke the keyboard upon detection that focus has been moved to one of the data entry areas 810a, 812a, 814a. But as with FIG. 7B, if the virtual keyboard is invoked, whether expressly by the user or automatically, it may overlay the user interface elements 825, 826, 827.

Therefore, as shown in FIG. 8B, in the user interface 800b the overlay user input interface 830 is invoked, so that the user may enter details concerning a new appointment. A primary function user interface element 840 is provided in the area of the display 110 above the data entry areas 810b, 812b, 814b, where it is not obscured by the overlay interface 830. The primary function user interface element 840 provided in this example is a "save" button, associated with a save function so that the user may save the data entered in the data entry areas 810b, 812b, 814b as an appointment in a calendar store on the communication device. In the user interface 800b, the primary function user interface element 840 is still positioned near the top of the display 110 where it is not obscured by the keyboard 830, but to avoid displacing the data entry areas 810b, 812b, 814b downwards, the first data entry area 810b is truncated and the primary function user interface element 840 disposed next to it. The overlay interface 830 may have been invoked as a result of focus moving to one of the data entry areas such as 810b, as shown by the cursor 850. As a portion of the original user interface 800a shown in FIG. 8A is obscured by the keyboard 830, in FIG. 8B a scroll user interface element 860 is provided, indicating to the user that additional content or data entry areas are available. The scroll user interface element 860 may be actuated in some embodiments to scroll to this portion of the user interface 800a.

In an alternate appointment view, shown in FIG. 8C, a graphical user interface 800c with one data entry area 812c and overlay interface 830 is provided. The primary user interface element remains a "save" button 842, but in this example no data entry field (e.g., data entry field 812c) is truncated. Again, in this view, because the overlay interface 830 overlaps at least a portion of the previously displayed elements in the graphical user interface 800c, additional scrolling interface elements 862, 864 indicating the continuation of content may be provided. In FIG. 8C, a downwards scroll arrow 864 is displayed near the end of the content displayed in the viewable data entry area 812c, indicating that additional content will be viewable by moving the focus downwards or by actuating a user interface element, such as the element 864, to scroll down through the content. The overlay interface 830 may still continue to be displayed in the lower region of the display 110. Similarly, the upwards scroll arrow 862 indicates that further content is viewable if the focus is moved in that direction or if the element 862 is actuated.

In a further appointment view 800d shown in FIG. 8D, the primary function user interface element 845 is now a "send" button, associated with a send function permitting the user to send the appointment data to an invitee. Information about invitees may be entered by the user in a designated data entry area, such as the data entry area 816 of FIG. 8E.

Thus, when the appointment view of the calendar application is invoked, the primary function user interface element 840 may be displayed in the graphical user interface 800c, thus providing the user with easy access to the "save" function to save the appointment data in the calendar store, since this is the most likely action the user would take; but if the user enters information about an invitee in a data entry area 816 using the overlay user input interface 830, then the primary function user interface element may change to the element 846 shown in FIG. 8E to provide the user with easy access to the "send" function, so that a meeting invitation may be sent to the invitee. The "send" function may also cause the data to be saved in the calendar store on the communication device 100. In this way, the user is able to trigger the most commonly used function associated with a particular view, even though the overlay interface 830 may be obscuring a portion of the touchscreen normally displaying controls associated with those functions.

Figure 9B:
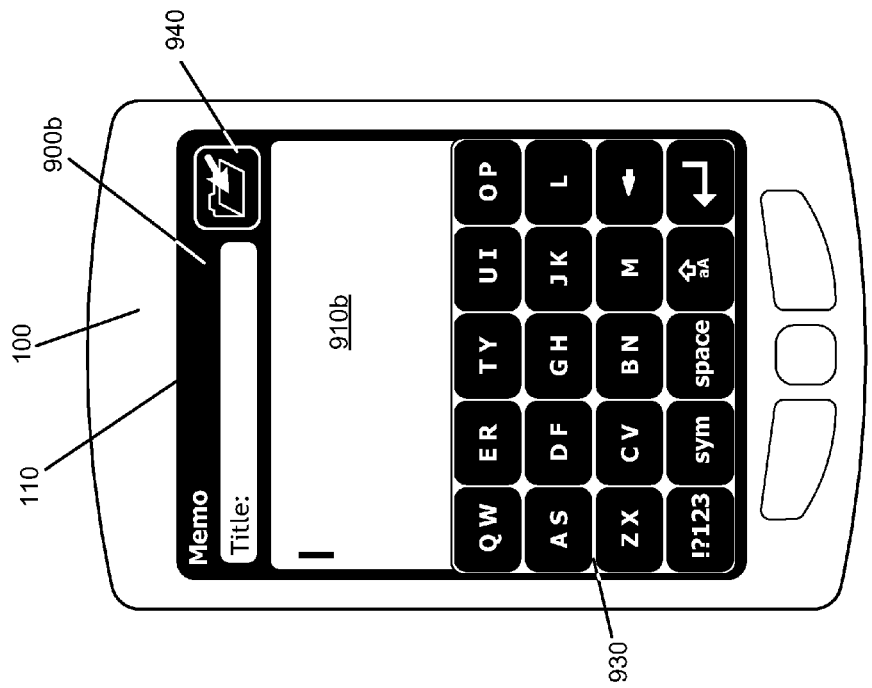
FIG. 9B is an illustration of a virtual keyboard with a modified graphical user interface for editing a memo file.
Figure 9A:
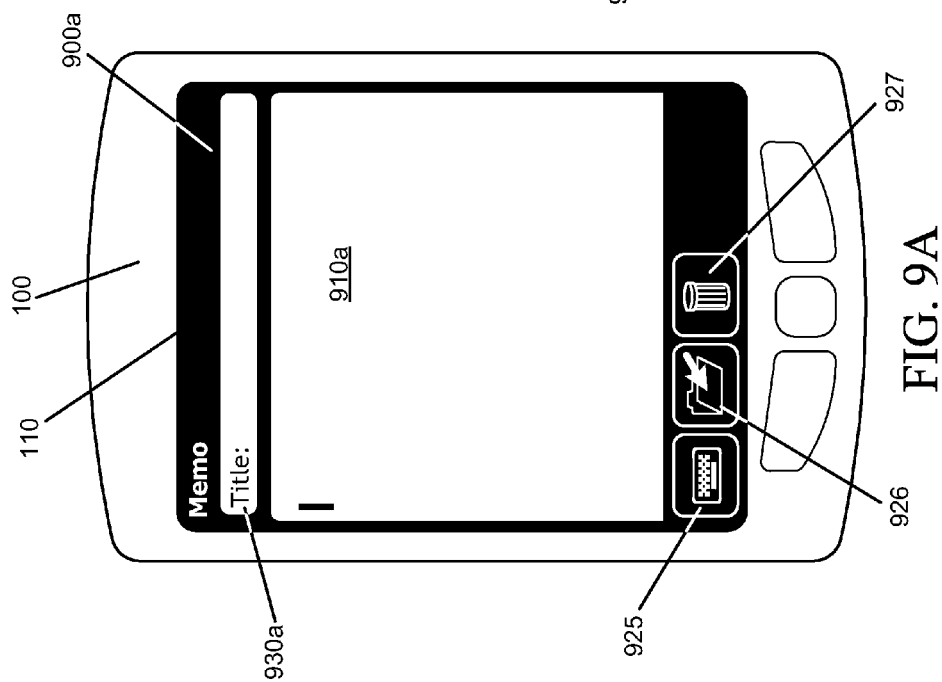
FIG. 9A is a diagram illustrating a graphical user interface for display on a communication device for editing a memo file.

Turning to FIG. 9A, a further example of a graphical user interface 900a for a memo or note-taking application is shown, with user interface elements 925, 926, 927 corresponding, again, to the actions of invoking a virtual keyboard, saving the memo file created in the user interface 900a, and discarding or deleting the memo file, together with a data entry area 930a and 910a. When the virtual keyboard 930 is invoked as shown in FIG. 9B, the primary function user interface element 940 may be a "save" button for saving the entered data to a memory store on the communication device.

FIGS. 10A through 10G show a further example for use with a messaging application, such as an e-mail application. The views in these figures depict a message composition view. In the first example of FIG. 10A, a user interface 1000a is shown, with data entry areas 1010a, 1012a, and 1014a, corresponding to recipients, subject, and body content, respectively. The graphical user interface 1000a includes user interface elements at the bottom of the screen 110, corresponding to a command to invoke the virtual keyboard 1025, send the message currently being composed 1026, saving the message as a draft 1027, and discarding changes or deleting the message 1028. Again, when the virtual keyboard 1030 is invoked, as shown in FIG. 10B, these user interface controls 1025 through 1028 will be obscured. Accordingly, it can be seen in FIG. 10B that a primary function user interface element 1040 is provided in the user interface 1000b, and the data entry areas 1010b, 1012b, 1014b are displaced accordingly. In this example, the primary function user interface element 1040 is the "send" button, which may be defined as the most likely action to be invoked by the user when in this message composition view. FIG. 10C illustrates a similar user interface 1000c, with a primary function user interface element 1042 located in a different position with respect to the recipient data entry field 1010c. FIG. 10D illustrates an alternative embodiment, in which the virtual keyboard 1035 is modified in the manner described above with respect to FIG. 6A, with an action key 1075, previously depicted as the "return" key, depicted as a "send" button. This "send" button may be actuatable to invoke the send command when the focus in the user interface 1000d is located in a data entry area that does not require use of the return key, such as the data entry area 1010d.

The graphical user interface 1000e of FIG. 10E again illustrates the message composition view, and includes an overlay interface 1030. In FIG. 10E, it can be seen that in the data entry area 1010e, no data has been entered identifying a recipient of a message, although data has been entered in data entry area 1012e regarding a subject line and the data entry area 1014e regarding message content. The primary function user interface element 1045 in this view is therefore a "save" button, enabling the user to save the message in draft form. The primary function user interface element 1045 may be accompanied by a caption 1047 providing further information regarding the action associated with the interface element 1045. The caption may be presented above the element 1047 at all times, or may appear only when the element 1047 is in focus. An alternate view is shown in FIG. 10F, in which there is a composed message, but no recipient identified in the data entry area 1010f. In this embodiment, the virtual keyboard 1037 has been altered to replace the return key with a "save" button 1080.

If the user enters recipient information, as shown in data entry area 1010g of the user interface 1000g shown in FIG. 10G, then the message may be sent to a recipient. Therefore, the primary function user interface element is changed to a "send" button 1049, enabling the user to send the message to the designated recipient(s). Thus, the user is able to trigger the most commonly used function associated with a particular view and as determined by the availability of particular data: in a message composition view, if no recipient data is entered, the user is more likely to save a draft message; but if recipient data is entered, then the user is likely to send the message to the recipient. The primary function user interface element 1045, 1049 is thus automatically selected to reflect the likeliest user action, and is displayed in the graphical user interface so that it is accessible to the user, even though the overlay interface 1030 used for data entry may be obscuring a portion of the touchscreen normally displaying controls associated with those functions. Again, the determination of the likeliest user action may be predefined within the application data itself, or may be configurable. In a further embodiment, the function associated with the primary function user interface element for a given application view does not change, but the user interface element remains inactivated in the graphical user interface until relevant data is entered. In the example of FIGS. 10E and 10G, the user interface element 1047 of the first graphical user interface 1000e may be a "send" button rather than a "save" button, but configured so as to be incapable of being actuated by the user until such time that recipient data has been entered into the address field 1010e. Once data has been detected in the field 1010g, the primary function user interface element 1049 is activated or enabled so as to be capable of being actuated by the user. The inactivated and activated states may be indicated visually on the display 110; for example, the "send" button may be displayed in a greyed-out or low contrast mode while inactivated, and displayed in full colour or regular contrast mode when activated or enabled.

Figures 11B, 11C:
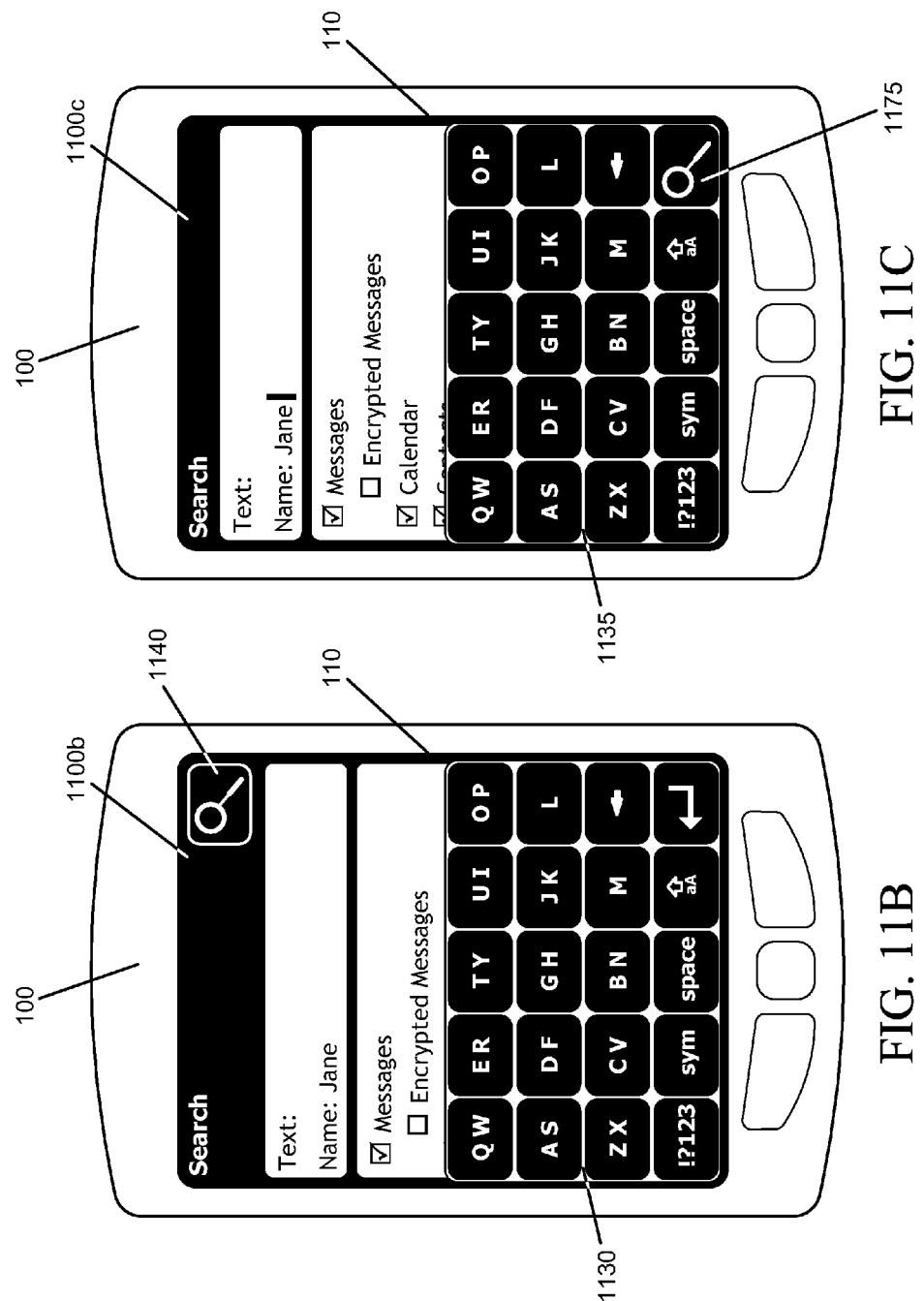
FIG. 11B is an illustration of a virtual keyboard and a modified graphical user interface for searching data.
FIG. 11C is a further illustration of a graphical user interface for searching data, shown with a modified virtual keyboard.

FIG. 11A illustrates a search application. The graphical user interface 1100 again includes the overlay interface 1130 as well as at least one data entry area 1110a, 1112a, in which the user may enter and select search keywords or parameters. The user interface 1100a includes a user interface element 1120, which may be actuated to initiate a search. Again, however, when a virtual keyboard is invoked, the user interface element 1120 may be inaccessible. Thus, in FIG. 11B, it can be seen in the user interface 1100b that the virtual keyboard 1130 has been invoked. When using a search application, the user is most likely to want to execute a search based on input search parameters, so the primary function user interface element 1140 is a "search" button, which when actuated launches a search function on the communication device 100 based on the input keywords or parameters. FIG. 11C illustrates a further embodiment of the user interface 1100c, in which the virtual keyboard 1135 has been modified to change the return key to an action key 1175 denoting the search function.

FIG. 12A illustrates a task application view for creating or editing a task with a number of data entry areas 1210a, 1212a and 1214a. The user interface 1200a of FIG. 12A also includes a number of user interface elements 1225, 1226 and 1227, representing commands for invoking the virtual keyboard, saving the task data, and deleting or discarding the task data or changes made thereto, respectively. When the overlay interface 1230 is invoked, as in the user interface 1200b of FIG. 12B, because the user is most likely to save the task data entered in the data entry areas, the primary function user interface element 1240 is a "save" button, which when actuated saves the task data to a data store on the communication device 100.

Figure 13D:
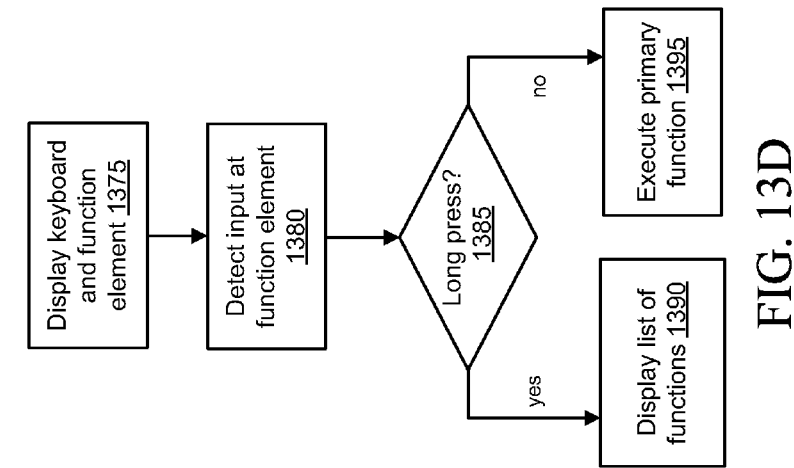
FIG. 13D is a flowchart illustrating a process for determining a set of displayable functions in response to actuation of a primary function user interface element.

The primary function user interface elements may be pre-determined, as explained above. Generally, the application executing on the device 100 may carry out the process illustrated in the flowchart of FIG. 13A. At 1300, a particular view or graphical user interface of the application is invoked. At 1305, a command to invoke the virtual keyboard is detected, which as discussed above may be due to an express user instruction, or in response to detecting that focus has been moved in the graphical user interface to a field requiring text input. At 1310, a default primary function (such as "save" or "send") is determined At 1315, the virtual keyboard and the primary function user interface element corresponding to the default primary function are displayed on the display 110.

Figure 13C:
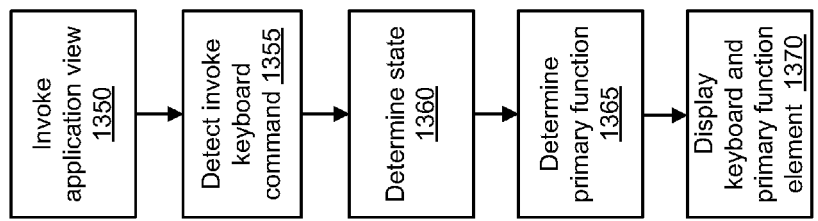
FIG. 13C is a flowchart illustrating a further process for displaying a keyboard and primary function user interface element.
Figure 13B:
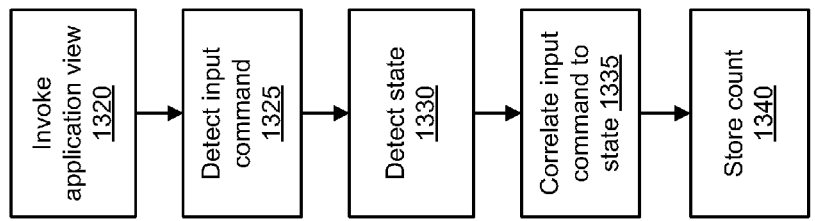
FIG. 13B is a flowchart illustrating a process for detecting a frequency of use of an input command.
Figure 13A:
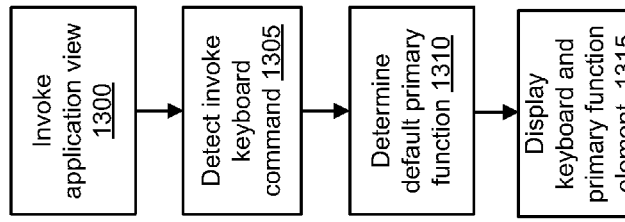
FIG. 13A is a flowchart illustrating a process for displaying a keyboard and primary function element.

In an alternate embodiment, the selection of the primary function user interface element may be configurable either manually or automatically. For example, if a user generally saves all composed e-mail messages as drafts before sending them even after the message is addressed to a recipient, the element 1049 shown in FIG. 10G may be configured as a "save" button instead, so that the user is provided with easy access to the save function. The type of element 1049 may be configured either through an option in the communication device 100's operating system, or as a configurable preference in the application itself. In a further embodiment, the application or operating system of the communication device 100 may be configured to "learn" the user's behaviour, and to adapt the primary function user interface elements according to the user's previous use of the functions or commands associated with the application, whether through the user interface elements 1025 through 1028 or other means, such as context menus. For example, the application or operating system may track the frequency with which the user selects a "save" option when composing an e-mail addressed to a recipient; if it is determined that the user actuates a save function more frequently than a send function, then the application or operating system may configure the primary function user interface element 1049 as a "save" button rather than a "send" button. An exemplary process for this feature is illustrated in FIG. 13B. At 1320, the particular view or graphical user interface of the application is invoked. At 1325, a user command is detected, such as a "save" or "send" command. At 1330, the current state of the application is determined—for example, whether the application is in an edit mode (e.g., an edit appointment graphical user interface) or in a different mode. This state is then correlated to the detected input command at 1335, and a count associated with this correlated input command and state is stored at 1340 if frequency of use of that input command is to be stored. Turning to FIG. 13C, the next time the application is invoked at 1350 and an invoke virtual keyboard command is detected at 1355, the current state of the application is determined at 1360, which may include determining what application view is currently displayed, and whether certain content has been input by the user (e.g., in the case of an e-mail composition screen, it may be determined whether recipient data has been entered via the graphical user interface, as described with reference to FIG. 10G above). Based on the determined state, the primary function for the primary function user interface element is determined at 1365 as the action associated with the detected input command associated with that state. If the aforementioned count is stored in association with each correlated input command and application state, then the primary function may be determined as that command having the greatest count associated with that application state, or else determine by other means which is the most frequently used function associated with the graphical user interface. This primary function user interface element and the virtual keyboard are then displayed at 1370.

In a further embodiment, if sufficient space is available in the graphical user interface, additional user interface elements may be added to the graphical user interface along with the primary user interface element. These additional elements may be associated with other functions that are not as frequently used, but are consistently used by the user. Thus, for example, the element 1045 of FIG. 10F may be provided next to the element 1049 of FIG. 10G in a message composition view of the messaging application, to provide easy user access to both the save and send functions. As an alternative, the single primary user interface element that is displayed may provide for the selection of different functions by the user. For example, actuating element 1049 by a first user action, such as a single, short tap or press, may trigger the function associated with that element, while a longer press on the element 1049 may invoke a drop-down list of alternate functions associated with the application or view that may be selected by the user. An example of this process is illustrated in FIG. 13D. The virtual keyboard and the primary function user interface element are displayed in the user interface at 1375. At 1380, an input is detected in relation to the primary function element. At 1385, it is determined what type of input was received, for example whether the input may be characterized as a long press rather than a tap. If it is determined that the input was a long press, then a list of alternative functions is displayed at 1390 for selection and actuation by the user. If the input was not a long press, then at 1395 the action associated with the primary function of the user interface element is executed. Alternatively or additionally, the drop-down list may be invoked through a separate user interface element displayed in the graphical user interface along with the primary function user interface element.

The embodiments described above therefore provide a user with easier access to frequently used functions associated with a particular application or with a particular view of an application, by providing at least a primary function user interface element actuatable by the user to trigger that function, even though buttons or other controls normally used to trigger that function are unavailable because they are overlaid by another interface, such as the overlay interface 630, 730, 830, 930, 1030. The selection of functions made available to the user in a given view may be determined, at least in part, by the type of data entered in a data entry area via the graphical user interface and the type of overlay interface. By providing the primary function user interface element, it is not necessary for the user to close or disable the overlay interface in order to invoke a desired function, thus reducing processor use and delay in redrawing the graphical user interface once the keyboard is dismissed.

It will be appreciated that the above embodiments may also apply to other applications or overlay input interfaces on the communication device. For example, as discussed above, although the accompanying drawings depict a virtual keyboard that may be overlaid on the touchscreen's graphical user interface, the overlaid input interface may comprise different virtual input controls, such as a touchpad, numeric keypad, mixing board, and the like. Similarly, it will be appreciated that the primary function user interface element need not be presented in the graphical user interface as a button, but may take the form of another user interface element. The applications and views described herein are generally directed to personal information management and messaging, but may also be directed to other activities such as Internet browsing.

The systems and methods disclosed herein are presented only by way of example and are not meant to limit the scope of the invention. Other variations of the systems and methods described above will be apparent to those skilled in the art and as such are considered to be within the scope of the invention. For example, it should be understood that steps and the order of the steps in the processing described herein may be altered, modified and/or augmented and still achieve the desired outcome.

The systems' and methods' data may be stored in one or more data stores. The data stores can be of many different types of storage devices and programming constructs, such as RAM, ROM, flash memory, programming data structures, programming variables, etc. It is noted that data structures describe formats for use in organizing and storing data in databases, programs, memory, or other computer-readable media for use by a computer program.

Code adapted to provide the systems and methods described above may be provided on many different types of computer-readable media including computer storage mechanisms (e.g., CD-ROM, diskette, RAM, flash memory, computer's hard drive, etc.) that contain instructions for use in execution by a processor to perform the methods' operations and implement the systems described herein.

The computer components, software modules, functions and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code.

A portion of the disclosure of this patent document contains material which is subject to copyright protection. The copyright owner has no objection to the facsimile reproduction by any one of the patent document or patent disclosure, as it appears in the Patent and Trademark Office patent file or records, but otherwise reserves all copyrights whatsoever.

The invention claimed is:

1. A method implemented by a mobile device comprising a touchscreen display, the method comprising:
- displaying a first graphical user interface on the touchscreen display, the first graphical user interface comprising:
  - a plurality of data entry areas including a recipient data entry area and at least one of: a subject data entry area or a message body data entry area; and
  - a plurality of user interface elements comprising a first user interface element and a second user interface element, each user interface element being actuatable using the touchscreen display to invoke a corresponding function, wherein the first user interface element represents a save function and the second user interface element represents a send function;
- displaying, in response to a user input into at least one of the data entry areas, a virtual keyboard overlaying the first graphical user interface such that the plurality of user interface elements are obscured and not actuatable;
- determining that the first user interface element is a primary function user interface element when no valid invitee or recipient information is entered into the recipient data entry area;
- displaying a modified graphical user interface on the touchscreen display wherein at least the primary user interface element, virtual keyboard and recipient data entry area are displayed and the primary user interface element is actuatable;
- receiving, in the recipient data entry area of the modified graphical user interface, valid invitee or recipient information; and
- in response to receiving the valid invitee or recipient information, changing the primary user interface element currently representing the save function to the second user interface element representing the send function on the modified graphical user interface.

2. The method of claim 1, wherein the plurality of user interface elements is located in a first region of the touchscreen display, the virtual keyboard is displayed in a portion of the touchscreen display including the first region, and the primary user interface element is displayed in a further region of the touchscreen display outside the portion comprising the virtual keyboard.

3. The method of claim 1, wherein the first graphical user interface and modified graphical user interface comprise a calendar graphical user interface, and wherein valid invitee information is received and the primary user interface element is changed in response to receiving the valid invitee information.

4. The method of claim 1, wherein the first graphical user interface and modified graphical user interface comprise a messaging graphical user interface, and wherein valid recipient information is received the primary user interface element is changed in response to receiving the valid recipient information.

5. The method of claim 1, wherein the primary user interface element corresponds to a primary function further determined by detected use of functions associated with the first graphical user interface.

6. The method of claim 5, wherein the primary function is a most frequently used function associated with the first graphical user interface.

7. A non-transitory computer-readable medium bearing code which, when executed by at least one processor of a mobile electronic device comprising a touchscreen display, causes the mobile electronic device to implement the method of:
- displaying a first graphical user interface on the touchscreen display, the first graphical user interface comprising:
  - a plurality of data entry area including a recipient data entry area and at least one of: a subject data entry area or a message body data entry area; and
  - a plurality of user interface elements comprising a first user interface element and a second user interface element, each user interface element being actuatable using the touchscreen display to invoke a corresponding function, wherein the first user interface element represents a save function and the second user interface element represents a send function;
- displaying, in response to a user input into at least one of the data entry areas, a virtual keyboard overlaying the first graphical user interface such that the plurality of user interface elements are obscured and not actuatable;
- determining that the first user interface element is a primary function user interface element when no valid invitee or recipient information is entered into the recipient data entry area;
- displaying a modified graphical user interface on the touchscreen display wherein at least the primary user interface element, virtual keyboard and recipient data entry area are are is displayed and the primary user interface element is actuatable;
- receiving, in the recipient data entry area of the modified graphical user interface, valid invitee or recipient information; and
- in response to receiving the valid invitee or recipient information, changing the primary user interface element currently representing the save function to the second user interface element representing the send function on the modified graphical user interface.

8. The non-transitory computer-readable medium of claim 7, wherein the plurality of user interface elements is located in a first region of the touchscreen display, the virtual keyboard is displayed in a portion of the touchscreen display including the first region, and the primary user interface element is displayed in a further region of the touchscreen display outside the portion comprising the virtual keyboard.

9. The non-transitory computer-readable medium of claim 7, wherein the first graphical user interface and modified graphical user interface comprise a calendar graphical user interface, and wherein valid invitee information is received and the primary user interface element is changed in response to receiving the valid invitee information.

10. The non-transitory computer-readable medium of claim 7, wherein the first graphical user interface and modified graphical user interface comprise a messaging graphical user interface, and wherein valid recipient information is received the primary user interface element is changed in response to receiving the valid recipient information.

11. The non-transitory computer-readable medium of claim 7, wherein the primary user interface element corresponds to a primary function further determined by detected use of functions associated with the first graphical user interface.

12. The non-transitory computer-readable medium of claim 11, wherein the primary function is a most frequently used function associated with the first graphical user interface.

13. A mobile electronic device, comprising:
a touchscreen display; and
at least one processor in communication with the touchscreen display, the at least one processor being configured to:
display a first graphical user interface on the touchscreen display, the first graphical user interface comprising:
a plurality of data entry area including a recipient data entry area and at least one of: a subject data entry area or a message body data entry area; and
a plurality of user interface elements comprising a first user interface element and a second user interface element, each user interface element being actuatable using the touchscreen display to invoke a corresponding function, wherein the first user interface element represents a save function and the second user interface element represents a send function;
display, in response to a user input into at least one of the data entry areas, a virtual keyboard overlaying the first graphical user interface such that the plurality of user interface elements-is are obscured and not actuatable;
determine that the first user interface element is a primary function user interface element when no valid invitee or recipient information is entered into the recipient data entry area;
display a modified graphical user interface on the touchscreen display wherein at least the primary first user interface element, virtual keyboard and recipient data entry area are displayed and the primary user interface element is actuatable;
receive, in the recipient data entry area of the modified graphical user interface, valid invitee or recipient information; and
in response to receiving the valid invitee or recipient information, change the primary user interface element currently representing the save function to the second user interface element representing the send function on the modified graphical user interface.

14. The mobile electronic device of claim 13, wherein the plurality of user interface elements is located in a first region of the touchscreen display, the virtual keyboard is displayed in a portion of the touchscreen display including the first region, and the primary user interface element is displayed in a further region of the touchscreen display outside the portion comprising the virtual keyboard.

* * * * *